United States Patent
Portisch et al.

(10) Patent No.: US 10,901,987 B2
(45) Date of Patent: Jan. 26, 2021

(54) DYNAMIC AUTOMATIC GENERATION OF DATABASE VIEWS

(71) Applicant: SAP SE, Walldorf (DE)

(72) Inventors: Jan Portisch, Bruchsal (DE); Sandra Bracholdt, Dielheim (DE); Volker Saggau, Bensheim (DE)

(73) Assignee: SAP SE, Walldorf (DE)

( * ) Notice: Subject to any disclaimer, the term of this patent is extended or adjusted under 35 U.S.C. 154(b) by 173 days.

(21) Appl. No.: 16/220,886

(22) Filed: Dec. 14, 2018

(65) Prior Publication Data

US 2020/0192892 A1 Jun. 18, 2020

(51) Int. Cl.
| | |
|---|---|
| *G06F 16/00* | (2019.01) |
| *G06F 16/242* | (2019.01) |
| *G06F 16/955* | (2019.01) |
| *G06F 16/22* | (2019.01) |
| *G06F 16/26* | (2019.01) |

(52) U.S. Cl.
CPC ...... *G06F 16/2445* (2019.01); *G06F 16/2282* (2019.01); *G06F 16/2428* (2019.01); *G06F 16/26* (2019.01); *G06F 16/955* (2019.01)

(58) Field of Classification Search
CPC ............... G06F 16/2445; G06F 16/955; G06F 16/2428; G06F 16/2282; G06F 16/26; G06F 16/2423; G06F 16/242; G06F 16/22; G06F 16/00; G06F 17/30; G06F 16/951; G06F 17/18; G06F 17/277; G06F 17/30864; G06F 40/258; G06F 40/44; G06F 16/9537; G06F 16/9535; G06F 16/285; G06F 16/24578; G06F 16/2379; G06F 16/24535; G06F 16/24544; G06F 16/289; G06F 16/9024; G06F 16/2453; G06F 16/28; G06F 16/288; G06F 16/212; G06F 3/04842; G06F 16/901; G06K 9/6267; G06K 9/6223; G06Q 10/04; G06Q 30/0205

See application file for complete search history.

(56) References Cited

U.S. PATENT DOCUMENTS

| | | | | |
|---|---|---|---|---|
| 5,546,570 A | * | 8/1996 | McPherson, Jr. | ..... G06F 16/284 |
| | | | | 707/773 |
| 7,111,020 B1 | | 9/2006 | Gupta | |

(Continued)

OTHER PUBLICATIONS

"Creating Alternate Keys," SAP Help Portal, May 17, 2018, 1 page.

(Continued)

*Primary Examiner* — Anh Ly
(74) *Attorney, Agent, or Firm* — Klarquist Sparkman, LLP

(57) ABSTRACT

A process for mining existing views to generate new views is provided herein. A request to generate a proposed view combining a plurality of tables in a database may be received. One or more existing views in the database applicable to the request may be identified. The applicable existing views may include the plurality of tables in the request. One or more paths combining the plurality of tables may be identified in the respective one or more existing views. The identified one or more paths may be provided. One or more scores for the one or more paths may be generated and provided along with the one or more paths. A path may be automatically selected based on the scores or a path may be selected by a user. A view may be generated based on the selected path.

20 Claims, 17 Drawing Sheets

(56) References Cited

U.S. PATENT DOCUMENTS

| | | |
|---|---|---|
| 7,158,994 B1 | 1/2007 | Smith |
| 7,480,669 B2 | 1/2009 | Lo et al. |
| 7,644,361 B2 | 1/2010 | Wu |
| 8,869,020 B2 | 10/2014 | Daga |
| 9,317,557 B2 | 4/2016 | Shao et al. |
| 9,400,815 B2 | 7/2016 | Poppitz |
| 9,436,735 B1 | 9/2016 | Feng et al. |
| 10,061,841 B2 | 8/2018 | Xiong et al. |
| 10,176,220 B2 | 1/2019 | Pirahesh et al. |
| 2001/0034733 A1 | 10/2001 | Prompt |
| 2003/0088558 A1* | 5/2003 | Zaharioudakis .. G06F 16/24539 |
| 2004/0015783 A1* | 1/2004 | Lennon ................. G06F 16/242 715/235 |
| 2004/0181543 A1* | 9/2004 | Wu ......................... G06F 16/26 |
| 2005/0060647 A1* | 3/2005 | Doan .................... G06F 16/248 715/205 |
| 2005/0097078 A1* | 5/2005 | Lohman ............ G06F 16/90335 |
| 2006/0101011 A1* | 5/2006 | Lindsay ............ G06F 16/24537 |
| 2006/0116859 A1* | 6/2006 | Legault ................. G06F 16/283 703/22 |
| 2006/0117057 A1* | 6/2006 | Legault ................. G06F 16/213 |
| 2006/0173873 A1 | 8/2006 | Prompt |
| 2007/0276836 A1* | 11/2007 | Chatterjee ............. G06F 16/182 |
| 2009/0043689 A1* | 2/2009 | Yang ...................... G06Q 30/04 705/38 |
| 2011/0008801 A1* | 1/2011 | Camesano ............. B82Y 15/00 435/7.21 |
| 2015/0293512 A1* | 10/2015 | Egge ..................... G06F 30/367 703/2 |
| 2016/0063043 A1 | 3/2016 | Carroll et al. |
| 2016/0217423 A1 | 7/2016 | Magnan et al. |
| 2016/0357787 A1 | 12/2016 | Kolata et al. |
| 2018/0024814 A1* | 1/2018 | Ouali ....................... G06F 8/35 717/105 |
| 2019/0303405 A1* | 10/2019 | Kothari ............. G06F 16/24544 |
| 2020/0012171 A1* | 1/2020 | Yoshino ................... G02B 7/28 |

OTHER PUBLICATIONS

"Association" SAP Help Portal, May 17, 2018, 3 pages.
"Alternative Keys," SAP Help Portal, May 17, 2018, 2 pages.
"Don't Try Coding ABAP Core Data Services Without Reading This First," Mar. 18, 2017, 10 pages.
"CDS Associations and Propagation with SQL in SAP HANA," May 17, 2018, 4 pages.
"SAP HANA Developer Guide," SAP HANA Platform 2.0 SPS 00, Nov. 30, 2016, 952 pages.
"Customizing and Extending Power Designer" PowerDesigner® 16.0, Sybase, Jul. 2011, 428 pages.
"CS 345: Topics in Data Warehousing," Oct. 12, 2004, 29 pages.

\* cited by examiner

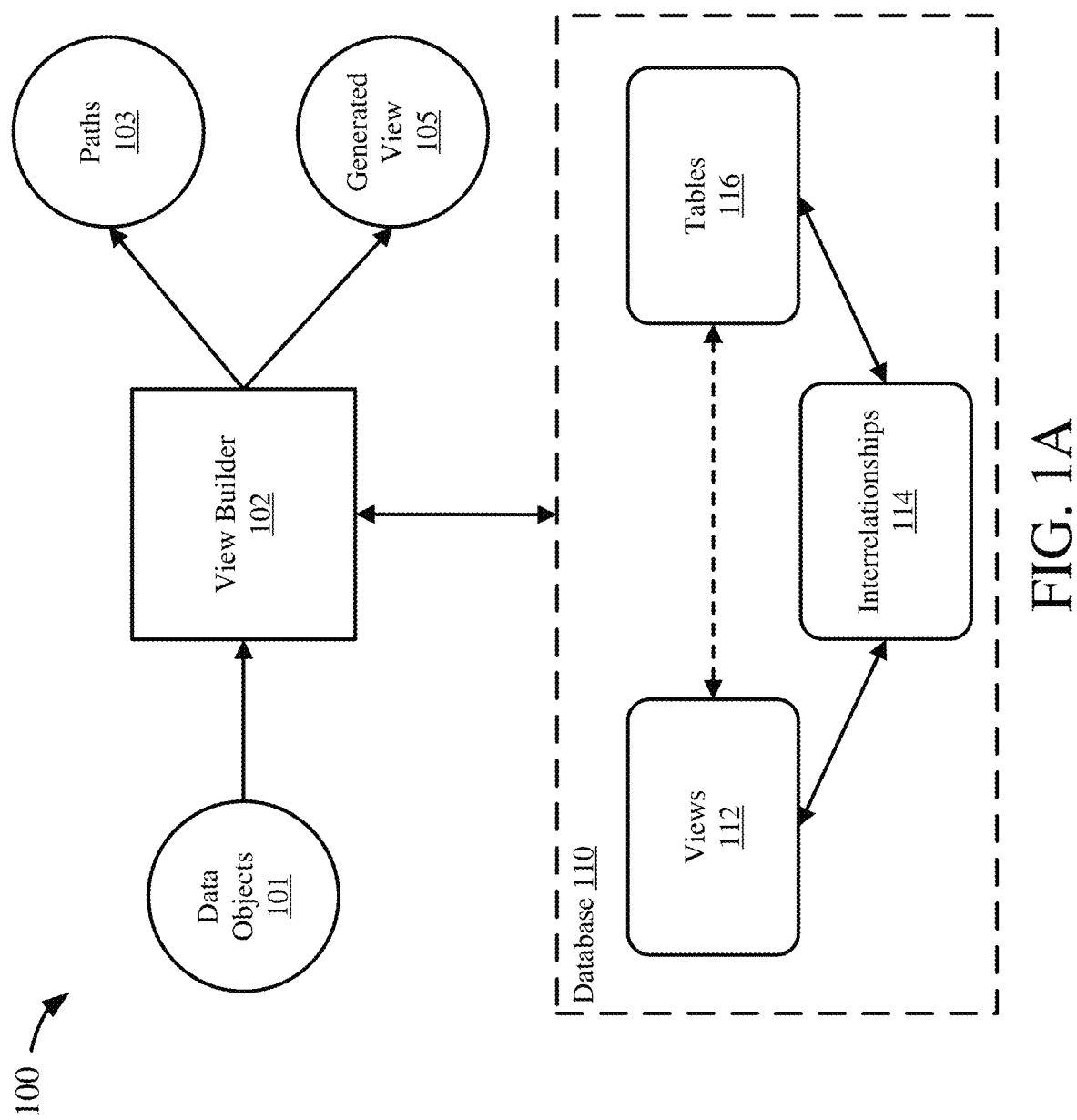

DYNAMIC AUTOMATIC GENERATION OF DATABASE VIEWS

FIELD

The present disclosure generally relates to view mining and building views using existing data model knowledge. Particular implementations relate to collaborative view building, and systems and methods for identifying applicable existing views for use in developing new views.

BACKGROUND

Enterprise data models are often very large and very complex, sometimes having thousands of entities, attributes, and relationships defined among the entities. While an enterprise data model may be well-documented, often they are not. Even when well-documented, such large data models generally require extensive documentation, and referencing such extensive documentation can be cumbersome while developing interfaces or reports for the data model. This can make development on enterprise data models expensive and slow. Thus, there is room for improvement.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A system for view mining of database views to perform a process for automatic view generation operations is provided herein. A request to generate a requested view may be received. The request may include a plurality of database object identifiers to be combined in the requested view. One or more first views may be identified in the database. The first views may include the plurality of database object identifiers.

If one or more first views are identified in the database, the process may perform the following steps. One or more complete paths connecting the plurality of database object identifiers in the one or more first views may be identified. One or more respective scores for the one or more complete paths may be calculated. An ultimate complete path may be selected based on the one or more respective scores for the one or more complete paths. The requested view may be generated based on the ultimate path selected.

If no first views are identified in the database, the process may perform the following steps. One or more second views may be identified in the database via the database identifier. The second views may include at least one of the plurality of database object identifiers. A plurality of partial paths may be identified in the second views. The respective partial paths in the plurality of partial paths may include at least one of the plurality of database object identifiers. Respective scores for the respective identified partial paths in the plurality of identified partial paths may be calculated. A composed path may be generated based on the plurality of identified partial paths and their respective scores. The composed path may connect the plurality of database object identifiers. The requested view may be generated based on the generated composed path.

The generated requested view for process may be provided.

A method for generating a proposed view in a database is provided herein. A proposed view request may be received, and may include a plurality of table identifiers for a respective plurality of tables in the database to be combined. One or more current views in the database may be identified. The current views may include at least one of the plurality of table identifiers. A plurality of partial paths may be identified in the current views. The respective partial paths in the plurality of partial paths may include at least one of the plurality of table identifiers. One or more composed paths for combining the plurality of tables may be generated based on the plurality of partial paths. The one or more composed paths may be provided in response to the proposed view request.

A method for providing one or more proposed views is provided herein. A request to generate a proposed view combining a plurality of tables in a database may be received. One or more existing views may be identified in the database applicable to the request. The existing views may include the plurality of tables. One or more paths combining the plurality of tables in the respective one or more existing views may be identified. The identified one or more paths may be provided.

The foregoing and other objects, features, and advantages of the invention will become more apparent from the following detailed description, which proceeds with reference to the accompanying figures.

BRIEF DESCRIPTION OF THE DRAWINGS

FIG. 1A is a schematic diagram depicting a view builder and database arrangement.

DETAILED DESCRIPTION

Figure 1B:
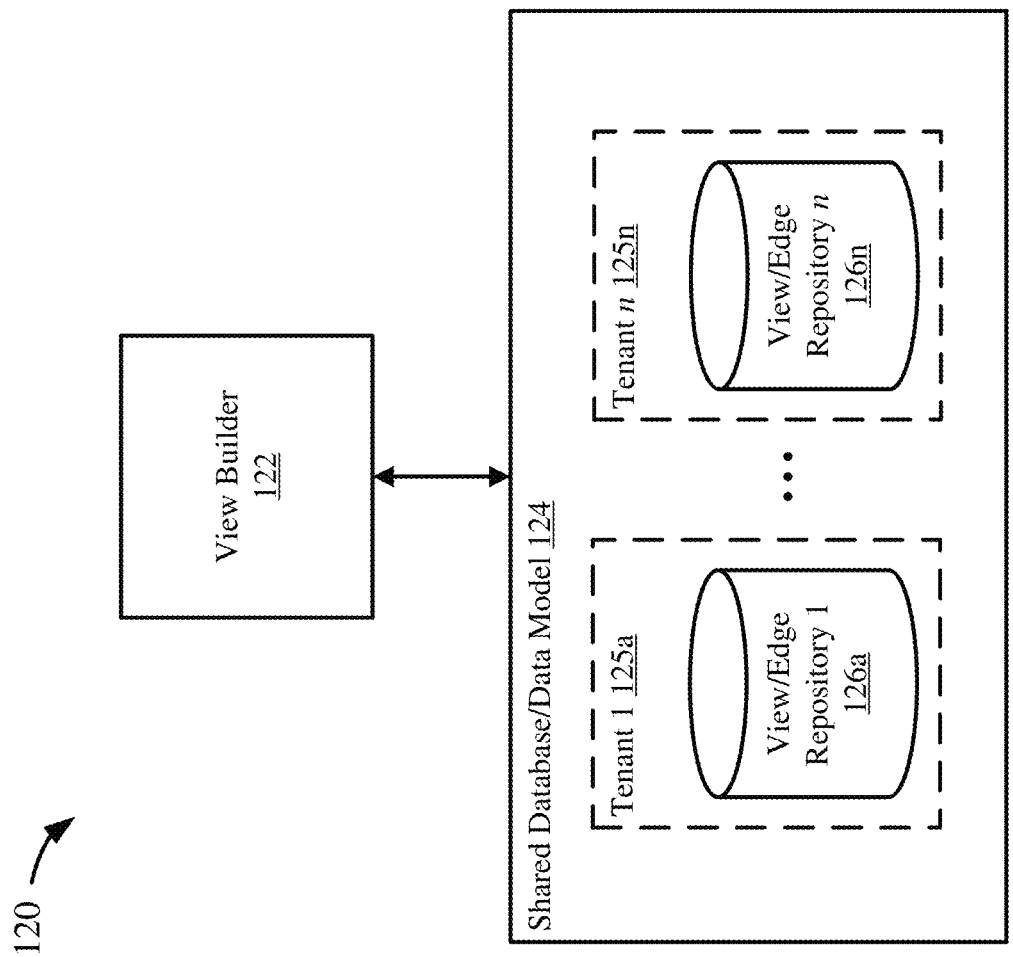
FIG. 1B is a schematic diagram depicting a view builder and multitenant database arrangement.

A variety of examples are provided herein to illustrate the disclosed technologies. The technologies from any example can be combined with the technologies described in any one or more of the other examples to achieve the scope and spirit of the disclosed technologies as embodied in the claims, beyond the explicit descriptions provided herein. Further, the components described within the examples herein may be combined or recombined as well, as understood by one skilled in the art, to achieve the scope and spirit of the claims.

Example 1—View Mining Overview

Views may be used in a database to aggregate or present data to a user in a way that is more useful to the user but may be different from the data model underlying the database. Thus, building views tailored to various uses is important for effective use of a database. However, this process may be difficult or time-consuming, especially with databases that have thousands of tables and other data objects, with complicated interrelationships. As views are built, the multitude of views represent accumulated knowledge for view development in the database.

View mining and building according to the present disclosure uses the accumulation of view development knowledge from the existing, already developed views to generate or recommend new views. By mining existing views for relevant table (or other data object) relationships, new view development can go from days/weeks/months to minutes or hours, with automatically generated views, view recommendations, or code recommendations. Such view mining may also improve the quality of the views developed, by selecting view combinations or interrelationships that are proven effective, such as by using view relationships that meet preference criteria, such as relationships that are more commonly used or have been tested and found to be more efficient (e.g. through query optimization or database stress testing). Thus, "crowd-sourced" views may be generated from view mining as disclosed herein.

As the number of available views increases, the view mining may become more effective, providing more view options that may be more effective. For cloud-based databases (e.g. databases implemented or deployed in the cloud), or other databases that are available broadly on a network, an even larger number of existing views may be made available for view mining, such as across multiple tenants in a multitenant database system.

View mining and building may be used in a broad swathe of scenarios. For example, a database administrator or software developer may desire to build a view connecting Table X to Table Y containing field A and field B, but not have worked with the data model before. Even if the developer has worked with the data model before, determining how to connect Tables X and Y and providing fields A and B may be difficult or laborious. By mining existing views for the data model, a view may be automatically generated that provides the request Tables X and Y with fields A and B. In another scenario, a customer may purchase a data model and be interested in utilizing existing views to reduce the start-up time of customizing or setting up the database. By mining existing views, such customers or developers may effectively utilize earlier efforts of others (or their own organization) to reduce development time or increase view quality.

View mining or automatic view generation or recommendation may be provided in an IDE, database management software, or other development environment or tool. Such tools may be SAP FSDP/FSDM™, HANA Native Data Warehouse™, PowerDesigner™, Enterprise Architect™, SAP HANA™, HANAWebIDE/Studio™, or combinations thereof, all by SAP SE of Walldorf, Germany.

In some cases, the existing views or the data model itself may be represented as a graph or set of graphs. Using a graph representation may improve the performance of view mining, as described herein. Further, graph representations may be exchangeable between database systems without requiring extensive copying of large databases or hiding sensitive database data, making the existing view knowledge transferrable between a wide range of systems.

Example 2—View Miner/Builder

FIG. 1A is a schematic diagram depicting a view builder and database arrangement 100. A view builder 102 may be used to mine data model information and relationships (e.g. defined connections between tables) from existing views 112 to recommend or generate new views 105. A view builder 102 may receive as input one or more database objects or data objects 101. Generally, the data objects 101 are names or other identifiers for data objects in a database 110. The data objects 101 may be received by the view builder 102 as part of a request to build a view composed of the data objects. The data objects 101 may be, or include, references to specific fields or tables, such as tables 116 or to specific fields of a table, in a database 110; the data objects may be references or identifiers to other data objects in the database as well, such as database views. In a particular example, the data objects 101 can be accessed in a data dictionary or information schema that includes definitions of database objects, such as view definitions and table definitions (e.g., table schemas, including table names, field names, field data types, primary key designations, foreign key relationships, other associations between one or more fields of a first table and one or more fields of a second table, and the like).

The view builder 102 may generate as outputs one or more paths 103 or generated views 105. A path output 103 may be a list or set of data object combinations from the database 110 that combines the input database objects 101 as requested. A path output 103 may also include additional data about the path, such as a number of uses of the path in the database 110 or a calculated efficiency (e.g., number of records processed, execution time, CPU use, network user, or similar measure of efficiency) of the path. A generated view output 105 may be a view requested with the database objects 101 combined by the view builder 102. The generated view 105 may be code, such as SQL code, for the view, or may be an instantiated view (e.g. a materialized view—the actual data retrieved by a query defined for the view). Generally, such a generated view 105 may be built based on determined paths 103 to combine the input database objects 101 in the database 110.

The view builder 102 may be configured to provide either paths 103 or generated views 105, or both, as described herein.

The view builder 102 may access the database 110 to analyze database objects (e.g. views 112, tables 116, interrelationships 114, or other database objects not shown, such as stored procedures) based on the input data objects 101, such as to determine data object or fields to connect the input data objects 101. The database may have views 112, tables 116, and interrelationships between the views and the tables 114. The interrelationships 114 may also be between different views 112, or between different tables 116. The interrelationships 114 may be between the views 112 and/or tables 116 themselves, or between particular fields of the views or tables. For example, the interrelationships 114 may represent foreign key fields (or other identifiers that indicate a relationship between fields of different database tables, such as an association between a first set of one or more fields of a first table and an alternate key of a second table) in a table that reference other tables.

The view builder 102 may access the database 110, and thereby access views 112, tables 116, and interrelationships 114 directly, such as by retrieving information for the database objects 101 from a data dictionary using a suitable identifier for the database object (i.e., its "name"). The view builder 102 may access a data dictionary or other database file or object in (or associated with) the database 110 that contains information on the views 112, tables 116, and interrelationships 114, in place of (or in addition to, in some cases) accessing the views or tables directly. In some embodiments, the view builder may access a data model, such as a schema or set of schema files for the database 110, in place of accessing the database itself. That is, the view builder may access alternate files in place of the database 110 that contain information that describes entities and relationships, and views defined between entities, that describe the database 110, which can be useful for the view builder (which thus may not require access to database data or to a database management system).

Example 3—View Miner/Builder with Multitenancy

FIG. 1B is a schematic diagram depicting a view builder and multitenant database arrangement 120. A view builder 122 may be used to mine data model information and relationships (e.g. defined connections between tables) from a shared database or data model 124, similar to FIG. 1A. The shared database or data model 124 may reside on a network (e.g. in the cloud) and may have one or more tenants, such as Tenants 1-*n* 125*a-n*, which access or otherwise use the shared database.

The tenants 125*a-n* may have their own respective sets of views in the database 124, such as View/Edge Repository 1 126*a* for Tenant 1 125*a* through View/Edge Repository n 126*n* for Tenant n 125*n*. The view repositories 126*a-n* may include views or programming scripts for views, data dictionaries, or graphical representations of views (or database relationships or edges). The view repositories 126*a-n* may reside outside tenant portions of the shared database 124 (e.g. secured data portions maintained separate from other tenants), so as to allow access by the view builder 122 without allowing access to sensitive or confidential tenant information or data. The view repositories 126*a-n* may have any sensitive or confidential information masked or removed, or may have all data removed and only contain the relational definitions or representations of the views (e.g. a graphical representation of the views, or other cluster/edge representation).

The view builder 122 may access some or all of the view repositories 126*a-n* when mining the shared database 124. In this way, the broad knowledge developed across multiple tenants, and database developers or administrators of those tenants, may be accessed and used through view mining, as described herein, to auto-generate or recommend new views.

Example 4—View Mining with Complete Paths

Figure 2A:
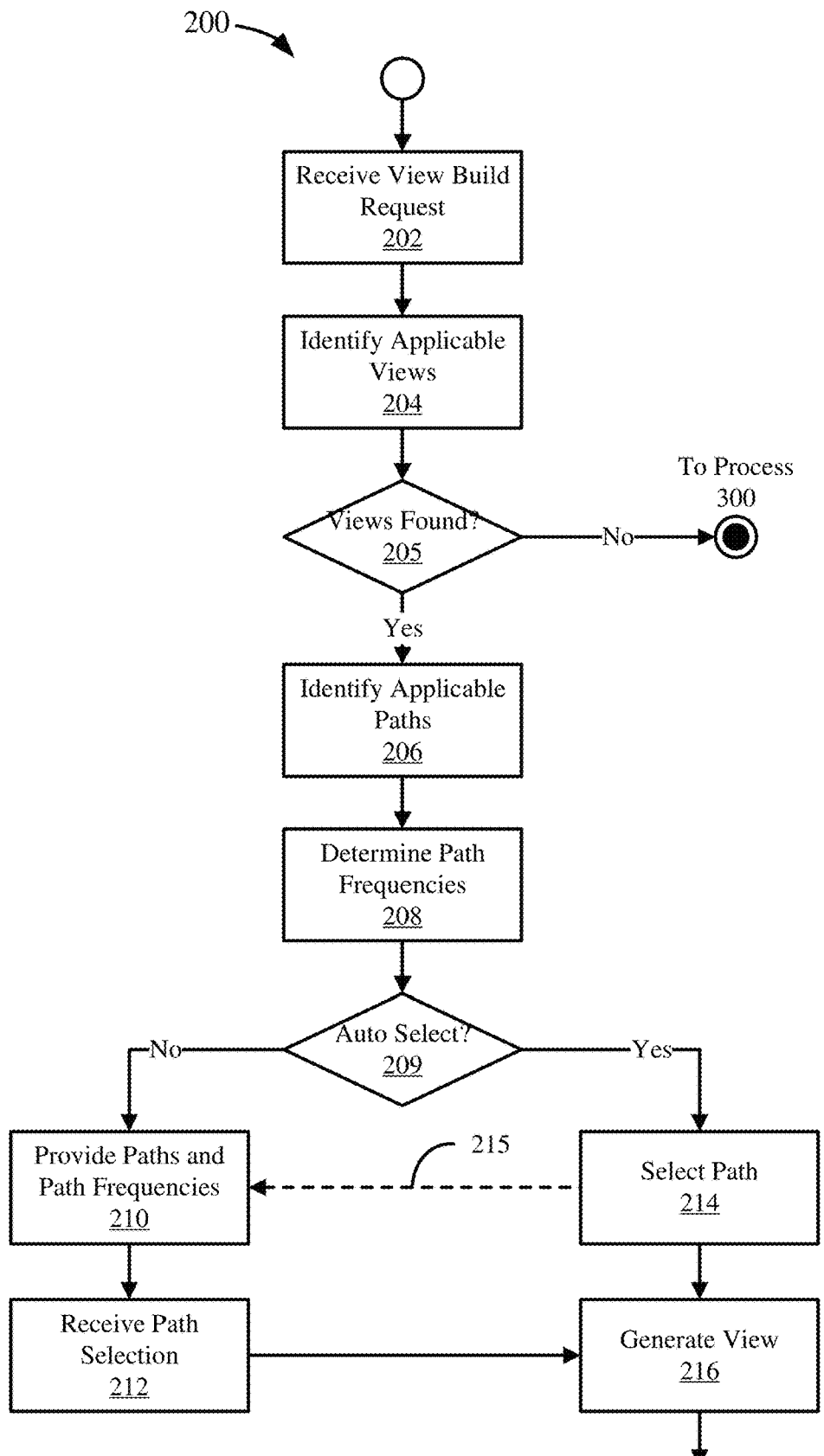
FIG. 2A is a flowchart illustrating a process for building a view with complete path view mining.

FIG. 2A is a flowchart illustrating a process 200 for building a view with complete path view mining. A request to build a view may be received at 202. The view-building request at 202 may include a reference or identifier to a database or a data model for which the view should be built. The request at 202 may further include identifiers for one or more data objects, such as tables, within the database or data model to combine into a view. The request at 202 may include other parameters as well, such as an indicator to auto-generate a view or provide view options to a user, or one or more criteria to use in determining how to build the view (e.g. max path length, max cost, a node or table type use indicator).

One or more existing views applicable to the request are identified at 204. Identifying the applicable views at 204 may include finding some or all of the existing views for the database or data model that contain the data objects to be combined into a view as received in the view-building request at 202. A database object, such as a data dictionary, may be accessed to determine which views contain the requested data objects. In some cases, the views themselves may be accessed to determine which views are applicable. In some embodiments, the applicable views identified at 204 may be trimmed to remove code or definitions unrelated to the data objects in the request from 202 (thus making the applicable views smaller or otherwise simpler to utilize or manipulate later).

Figure 3A:
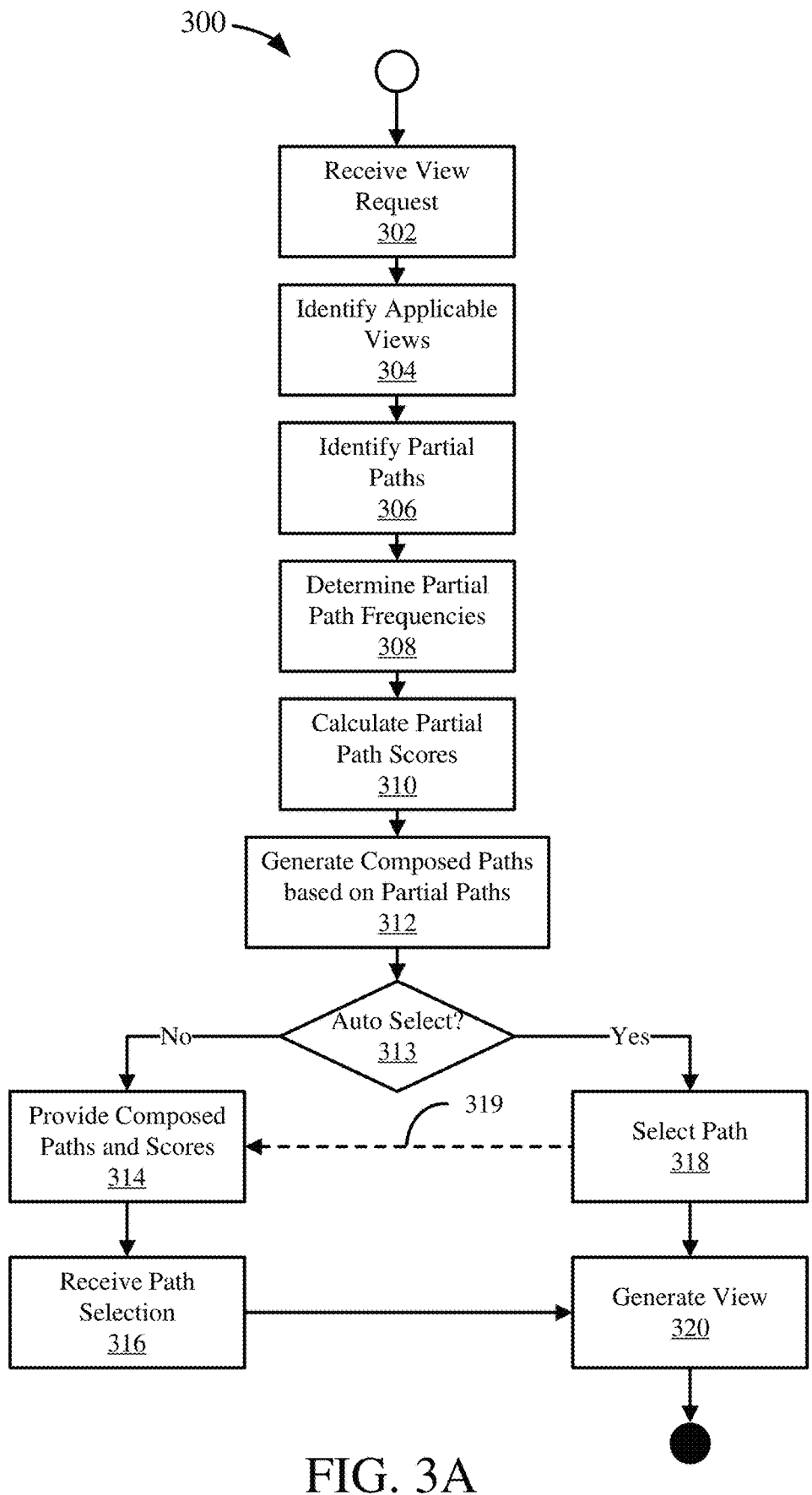
FIG. 3A is a flowchart illustrating a process for building a view with incomplete path view mining.

The process determines if applicable views are found at 205. If no applicable views are identified at 204 ("no" at 205), generally meaning that no view containing all data objects requested to be combined together is discovered, then the process 200 may incorporate or otherwise proceed to the process 300 starting at step 302, as shown in FIG. 3A. Alternatively, the process 200 may end at 205 if not applicable views are found; in such a scenario, the process 200 may return no results, or a message or variable indicating no applicable views were found. If one or more applicable views are found ("yes" at 205), the process 200 continues.

One or more combination paths in the identified views may be identified at 206. A combination path as identified at 206 may be a set of data objects in the database that are used in an existing view (e.g. an identified applicable view) that combines the data objects received in the view-building request at 202; such a combination path is a complete path between the data objects to be connected or combined. For example, a combination path may be the set of tables and fields used to combine Table A and Table B that may have been requested at 202, such tables connecting Table A and Table B may be a single intermediate table Table C, or may be multiple intermediate tables, Table D and Table E (or more), or no intermediate tables if there is direct connection between A and B. The separate applicable views identified at 204 may each have a separate combination path identified at 206.

A combination path may be identified at 206 for each set of data objects requested to be combined into a view at 202. Thus, multiple combination paths may be identified for each set of data objects to combine. For example, if a view is requested at 202 to combine Tables A and B, and combine Tables X and Y, one or more combination paths may be identified for Tables A and B, and one or more combination paths may be identified for Tables X and Y.

In some cases, some applicable views may have the same combination path as other applicable views. The frequencies of each combination path identified at 206 may be determined at 208. Determining the frequency of the combination paths at 208 may include counting the number of occurrences in the applicable views of a given identified combination path. Determining the combination path frequencies at 208 may be similar to deduplicating, while maintaining a count of, the identified combination paths from 206.

The process 200 determines at 209 how to proceed with the combination paths identified at 208, which may be accomplished with an auto-select flag or indicator. An auto-select indicator may be received as part of a view-building request at 202, or may be otherwise configured and stored, for example, as a user-configurable registry setting, for the process 200.

If the process 200 determines to auto-select a combination path ("yes" at 209), a combination path is selected at 214 from the combination paths identified at 206. A combination path may be selected at 214 based on the path frequencies determined at 208. Alternatively or additionally, a combination path may be selected at 214 based on additional selection criteria or rules. For example, a combination path may be selected based on a path efficiency value, or a combination of path frequency and path efficiency, or path frequency or efficiency exceeding a given threshold. Such rules or criteria may be user-configurable, and may be combined or arranged in a hierarchy.

A combination path may be selected at 214 for each set of data objects requested to be combined into a view at 202. Thus, multiple combination paths may be selected, while generally a single combination path is selected for a given set of data objects to combine. For example, if a view is requested at 202 to combine Tables A and B, and combine Tables X and Y, a combination path may be selected for Tables A and B, and a combination path may be selected for Tables X and Y.

In some scenarios, a combination path may not be selected at 214 because a preferred or optimal path may not be identifiable. For example, two paths may have the same frequency of use, or score, or meet the same selection criteria (or have no attributes upon which to select). In such cases, the process 200 may direct the identified paths 215 to be provided at 210, such as to a user, as described herein. In further cases, if multiple paths are identified as equivalent, a path can be randomly chosen or chosen according to other criteria.

A view may be generated at 216 based on the selected combination path or paths from 212 or 214. Generating a view at 216 may include generating source code, such as SQL code, for a view based on the selected combination path(s). In some embodiments, the generated source code may be executed to instantiate the view in a database. Additionally or alternatively, the source code may be stored in the database (or other data file or location). In some cases, the generated source code may be displayed to a user through a user interface, which may further allow editing or other refinement of the generated source code or path (which in turn could be used to refine the generated source code); editing or refining may include writing or re-writing the code for the view, or testing the view, or providing a graphical representation of the view which may be edited.

If the process 200 determines not to auto-select a combination path ("no" at 209), the identified combination paths from 206 may be provided at 210. Generally, the determined combination path frequencies from 208 may be provided along with their associated combination paths, as well; any other identified or calculated attributes or metadata of the combination paths (e.g. path efficiency) may be provided as well. The combination paths and frequencies may be provided at 210 via a user interface, or through an API or other programmatic interface.

A combination path selection may be received at 212. In some cases, where multiple data object combinations were requested to be combined at 202, a separate path selection may be received at 212 for some or all of the separate data object combinations. The path selection(s) may be received at 212 through a user interface, for example, or through an API or other programmatic interface.

Once a path selection(s) is received, a view may be generated at 216 based on the path selection(s) from 212, as described herein.

In some embodiments, an auto-select determination at 209 may not be implemented, and either process portion from 209 (steps 214 and 216 under "yes" or steps 210, 212, and 216 under "no") may be implemented.

The following pseudocode represents the process 200 (in part) when implementing view mining against views in a database, such as may be represented as graphs.

```
List<View> relevantViews ← FILTER AllViewsAvailable for Views
Containing X and Y
List<Path> trimmed ← TRIM relevantViews so that they only contain
the paths connecting X and Y
Map<Path, Int> withFrequency ← COUNT unique paths in trimmed
OUTPUT ( SORT DESCENDING (withFrequency) )
```

A simple example implementation may include defining "View" as a class (which may contain information about a view in the database), and defining "AllViewsAvailable" as a Set that contains instantiations of the View class, e.g. Set<View> AllViewsAvailable; (for example, the Java class HashSet<ClassType> may be used). Such a View class definition may be as follows:

```
Class View {
    List<Edge> edgesUsedInView;
    Method boolean containsNode(Node n):
        For Edge e in edgesUsedInView:
            If e.getVertex1( ) == n then
                return true
            Else if e.getVertex2( ) == n then
                Return true
        Return false
};
```

Based on this example View class definition, the pseudocode "List<Path> trimmed←TRIM relevantViews so that they only contain the paths connecting X and Y" may be represented in more detail by:

```
List<View> relevantViews;
For each View v in AllViewsAvailable:
    If v.containsNode(X) then
        relevantViews.add(v)
    Else If v.containsNode(Y) then
        relevantViews.add(v)
```

Example 5—Automatic View Mining with Complete Paths Scenario

Figure 2B:
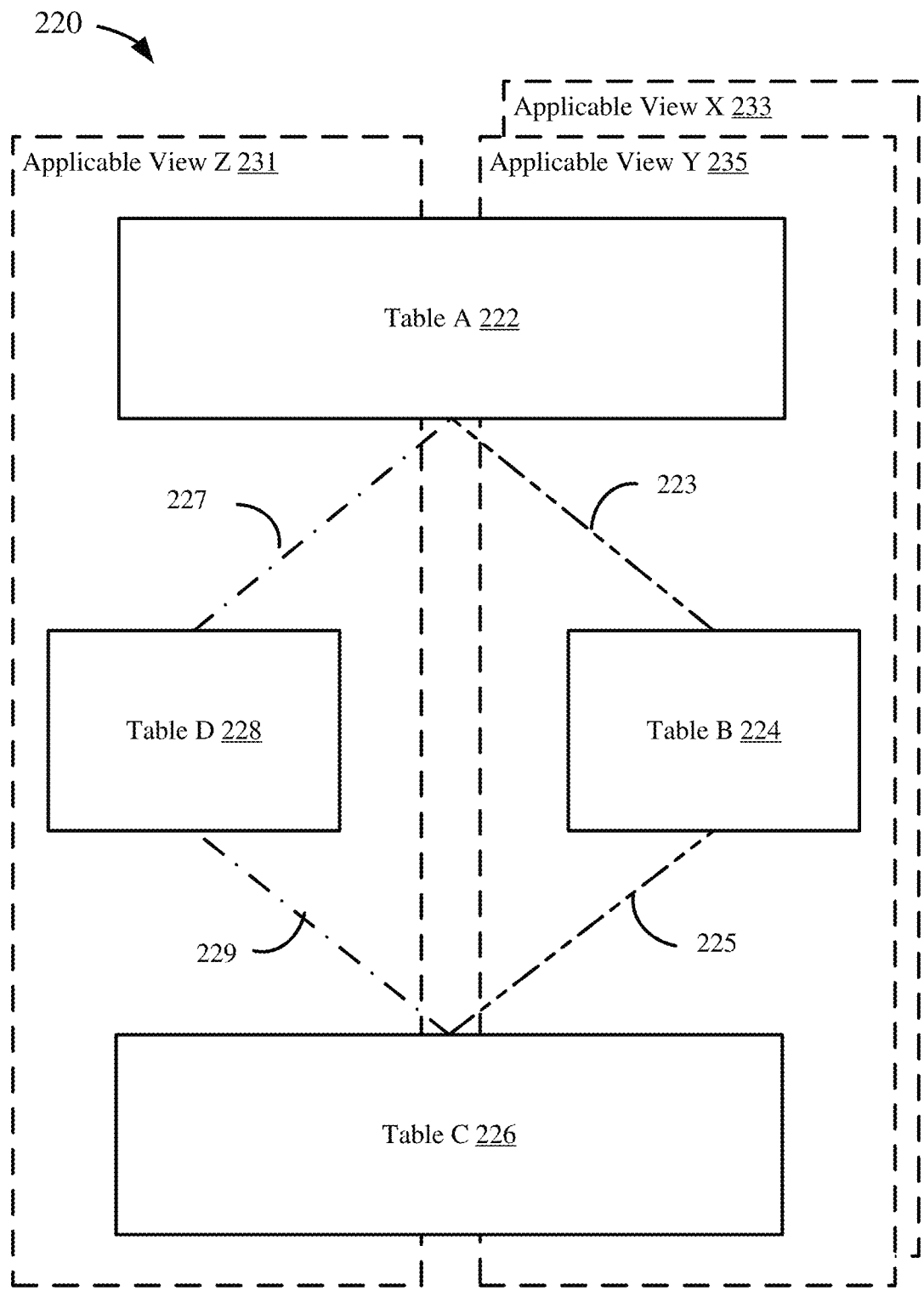
FIG. 2B illustrates an example set of views, data objects, and paths for use in view building with complete paths.

FIG. 2B illustrates an example set 220 of views, data objects (tables), and paths for use in view building with complete paths, such as by the process 200 shown in FIG. 2A. A request may be made (e.g. at 202 in FIG. 2A) to combine two tables, Table A 222 and Table C 226 within a database or data model.

Several applicable views 231, 233, 235 may be identified (e.g. at 204 in FIG. 2A) that contain both Table A 222 and Table C 226. Generally, the views contain references to the tables, or data pulled from the tables, but not the tables themselves. Applicable View Z 231 may contain Table A 222, Table C 226, and Table D 228; Applicable View X 233 and Y 235 may contain Table A 222, Table B 224, and Table C 226. These views 231, 233, 235 may also contain other tables or database objects in addition to those illustrated.

The paths combining Table A 222 with Table C 226 may be identified (e.g. at 206 in FIG. 2A). A first path identified may be the path in Applicable View Z 231, which is the relationship 227 from Table A 222 to Table D 228, and then the relationship 229 from Table D to Table C 226. Thus, Table A to Table D to Table C may be a path identified, which may be represented as A->D->C, or A;D;C, ADC, or some other ordered set. The path may include specific fields from the tables 222, 228, 226 which form the relationships 227, 229, such as foreign keys or associations.

A second path identified may be the path in Applicable View Y 235, which is the relationship 223 from Table A 222 to Table B 224, and then the relationship 225 from Table B to Table C 226. Thus, Table A to Table B to Table C may be a path identified, which may be represented as A->B->C, or A;B;C, ABC, or some other ordered set. The path may include specific fields from the tables 222, 224, 226 which form the relationships 223, 225, such as foreign keys or associations.

A third path identified may be the path in Applicable View X 233, which may be the same path as identified in Applicable View Y 235. Thus, two views 233, 235 may provide the same path A->B->C through relationships 223 and 225.

In some scenarios, a path may include multiple intermediate data objects (e.g. tables or views).

A number of times a path, such as ABC or ADC, is found in the applicable views may be counted (e.g. at 208 in FIG. 2A). The number of times a particular path is used in the existing views may indicate the usefulness or effectiveness of the path (as in, the more a path was used previously by being coded into a view, the more likely that path is better to use). Thus, results of a request to combine Table A 222 with Table C 226 may be paths (with frequency counts) A->B->C (2) and A->D->C (1). Such results may be provided, such as in a user interface (e.g. at 210 in FIG. 2A) or may be selected from automatically (e.g. at 214 in FIG. 2A). If automatically selected based on frequency of occurrence, path A->B->C may be selected as it occurs in two views 233, 235, as opposed to the single occurrence of A->D->C. Once a path is known and selected, a view may be automatically generated, or developed by a user, based on the selected path (e.g. at 216 in FIG. 2A).

Example 6—View Mining with Incomplete Paths

FIG. 3A is a flowchart illustrating a process 300 for building a view with incomplete path view mining. A request to build a view may be received at 302, which may be similar to step 202 in process 200 shown in FIG. 2As. The view-building request at 302 may include a reference or identifier for a database or a data model for which the view should be built. In some case, an explicit database or data model can be omitted, as view building application may otherwise be configured to access a specific database or data model. The request at 302 may further include identifiers for one or more data objects, such as tables or views, within the database or data model to combine into a view. In some embodiments, the request at 302 may include identifiers for particular fields or sub-objects of the included data objects. For example, a table and a field of that table may be specified in the request. The request at 302 may include other parameters as well, such as an indicator to auto-generate a view or provide view options to a user, or one or more criteria to use in determining how to build the view (e.g. max path length, max cost, a node or table type use indicator).

One or more existing views applicable to the request are identified at 304. Identifying the applicable views at 304 may include finding some or all of the existing views for the database or data model that contain at least one of the data objects to be combined into a view as received in the view-building request at 302. Generally, not all the data objects to be combined will be found in a single view at 304; if a view is discovered that includes all the data objects to be combined, then the process 200 shown in FIG. 2A may be used. A database object, such as a data dictionary (or a graph model representation or edge repository of the database/data model), may be accessed to determine which views contain the requested data objects. In some cases, the views themselves may be accessed to determine which views are applicable.

One or more partial combination paths in the identified views may be identified at 306. A partial combination path, as identified at 306, may be a set of data objects in the database connected together in an existing view (e.g. an identified applicable view), where the set of connected data objects has at least one of the data objects received in the view-building request at 302. For example, a partial combination path may be a set of tables and fields that are linked to or combined with Table A, or separately Table B (but not both Tables A and B), that may have been requested at 302. The separate applicable views identified at 304 may each have a separate partial combination path identified at 306.

One or more partial combination paths may be identified at 306 for each data object requested to be combined into a view at 302. Thus, multiple partial combination paths may be identified for each data object to combine. For example, if a view is requested at 302 to combine Tables A and B, and combine Tables X and Y, one or more partial combination paths may be identified for Table A (e.g. Table A path with Table C and another path with Tables D and E), and separate paths for Table B (e.g. Table B path with Table F, another path with Table D, and another path with Table C and G), and so on for Table X and Table Y.

In some cases, some applicable views may have the same partial combination paths as other applicable views. The frequencies of each partial combination path identified at 306 may be determined at 308. Determining the frequencies of the combination paths at 308 may include counting the number of occurrences in the applicable views of a given identified partial combination path. Determining the partial path frequencies at 308 may be similar to deduplicating, while maintaining a count of, the identified partial paths from 306.

Scores may be calculated for the identified partial paths at 310. A score may be calculated for a given partial path by a weighting formula. For example, the weighting formula $1-1/f$, where f is the frequency of the partial path, may be used to calculate the scores. Other scoring or weighting formulas may be used, and may utilize other partial path attributes or criteria, such as path efficiency. In some examples, the score calculation may thus utilize "crowd knowledge" or "swarm intelligence" (e.g. the frequency of use of a path) to determine the value or usefulness of a given partial path, which may include using rules or criteria as described herein.

Composed paths may be generated at 312 from the partial paths identified at 306. A composed path may be a combination of partial paths that combine two data objects as requested at 302. For example, Tables A and B may be requested to be combined, and a partial path for Table A may be Table A and C, and a partial path for Table B may be Tables B and C. Thus, the composed path may be generated as Table A, Table C, and Table B, as a composition of partial path A to C and partial path B to C. Generating the composed paths at 312 may include iterating through the partial paths to generate paths that combine requested data objects. For example, a shortest path algorithm may be used to generate the composed paths from the partial paths. Generally, one or more composed path may be generated for each requested combination of data objects. In some cases, a single composed path may be generated with an algorithm that simultaneously selects the shortest (or preferred) path during the path generation (e.g. it generates the preferred path).

The process 300 may determine at 313 how to proceed with the composed paths generated at 312, which may be accomplished with an auto-select flag or indicator, similar to step 209 in process 200 shown in FIG. 2A. An auto-select indicator may be received as part of a view-building request at 302, or may be otherwise configured and stored, for example, as a user-configurable registry setting, for the process 300.

If the process 300 determines to auto-select a composed path ("yes" at 313), a composed path may be selected at 318 from the set of composed paths generated at 312. A composed path may be selected at 318 from the generated composed paths from 312 based on their respective scores calculated at 310. The selecting at 318 may include taking the composed path with the highest or lowest score (depending on the scoring function), or a score that exceeds or is below a threshold, or a score that meets some other criteria or rule(s). The scores may be used in combination with other composed path attributes, such as frequency of use or total path length.

Alternatively or additionally, a composed path may be selected at 318 based on the partial path frequencies determined at 308, which may include combining the partial path frequencies for a given composed path. As a further alternative or addition, a composed path may be selected at 318 based on additional selection criteria or rules. For example, a composed path may be selected based on a path length, path efficiency value, or a combination of path frequency and path efficiency, or path frequency or efficiency exceeding a given threshold, or path length below a given threshold while path efficiency is above another threshold, or so on. Such rules or criteria may be user-configurable, and may be combined or arranged in a hierarchy.

A composed path may be selected at 318 for each set of data objects requested to be combined into a view at 302. Thus, multiple composed paths may be selected, while generally a single composed path is selected for a given set of data objects to combine. For example, if a view is requested at 302 to combine Tables A and B, and combine Tables X and Y, a composed path may be selected to combine Tables A and B, and another composed path may be selected to combine Tables X and Y.

In some scenarios, a composed path may not be selected at 318 because a preferred or optimal path may not be identifiable. For example, two composed paths may have the same score, or frequency of use, or meet the same selection criteria (or have no attributes upon which to select). In such cases, the process 300 may direct the composed paths at 319 to be provided at 314, such as to a user, as described herein. Or, a path can be randomly selected from multiple equivalent paths, or a path can be selected based on other criteria.

A view may be generated at 320 based on the selected composed path or paths from 314 or 318, similar to step 216 in process 200 shown in FIG. 2A. Generating a view at 320 may include generating source code, such as SQL code, for a view based on the selected composed paths. In some embodiments, the generated source code may be executed to instantiate the view in a database. Additionally or alternatively, the source code may be stored in the database (or other data file or location). In some cases, the generated source code may be displayed to a user through a user interface, which may further allow editing or other refinement of the generated source code.

If the process 300 determines not to auto-select a composed path ("no" at 313), the generated composed paths from 312 may be provided at 314, similar to step 210 in process 200 shown in FIG. 2A. Generally, the composed path scores from 310 may be provided along with their associated composed paths, as well. In some cases, the determined composed path frequencies from 308 may be provided along with their associated composed paths; any other identified or calculated attributes or metadata of the composed paths (e.g. path efficiency) may be provided as well. The composed paths and scores may be provided at 314 via a user interface, or through an API or other programmatic interface.

A composed path selection may be received at 316. In some cases, where multiple data object combinations were requested to be combined at 302, a separate path selection may be received at 316 for some or all of the separate data object combinations. The path selection(s) may be received at 316 through a user interface, for example, or through an API or other programmatic interface.

Once a path selection(s) is received, a view may be generated at 320 based on the path selection(s) from 316, as described herein.

In some embodiments, an auto-select determination at 313 may not be implemented, and either process portion from 313 (steps 318 and 320 under "yes," or steps 314, 316, and 320 under "no") may be implemented.

The following pseudocode represents the process 300 (in part) when implementing view mining against views in a database, such as may be represented as graphs.

```
Set<Edge> relevantEdges ← FILTER all edges on paths connecting
    X and Y
List<Edge> usedEdges
FOR View v IN AllViewsAvailable DO
    usedEdges.addAll (v.getEdges( ) ELEMENT relevantEdges)
END FOR
Map<Path, Int> withFrequency ← COUNT unique paths in usedEdges
Map<Path, Score> edgesWithScores
FOR Edge e, Frequency f IN edgesWithScores DO
    edgesWithScores.add(e, 1−1/f)
END FOR
edgesWithScores.addAll( (relevantEdges, 1) NOT IN edgesWithWeights)
EXECUTE a shortest path algorithm on edgesWithScores
```

Example 7—Automatic View Mining with Incomplete Paths Scenario

Figure 3B:
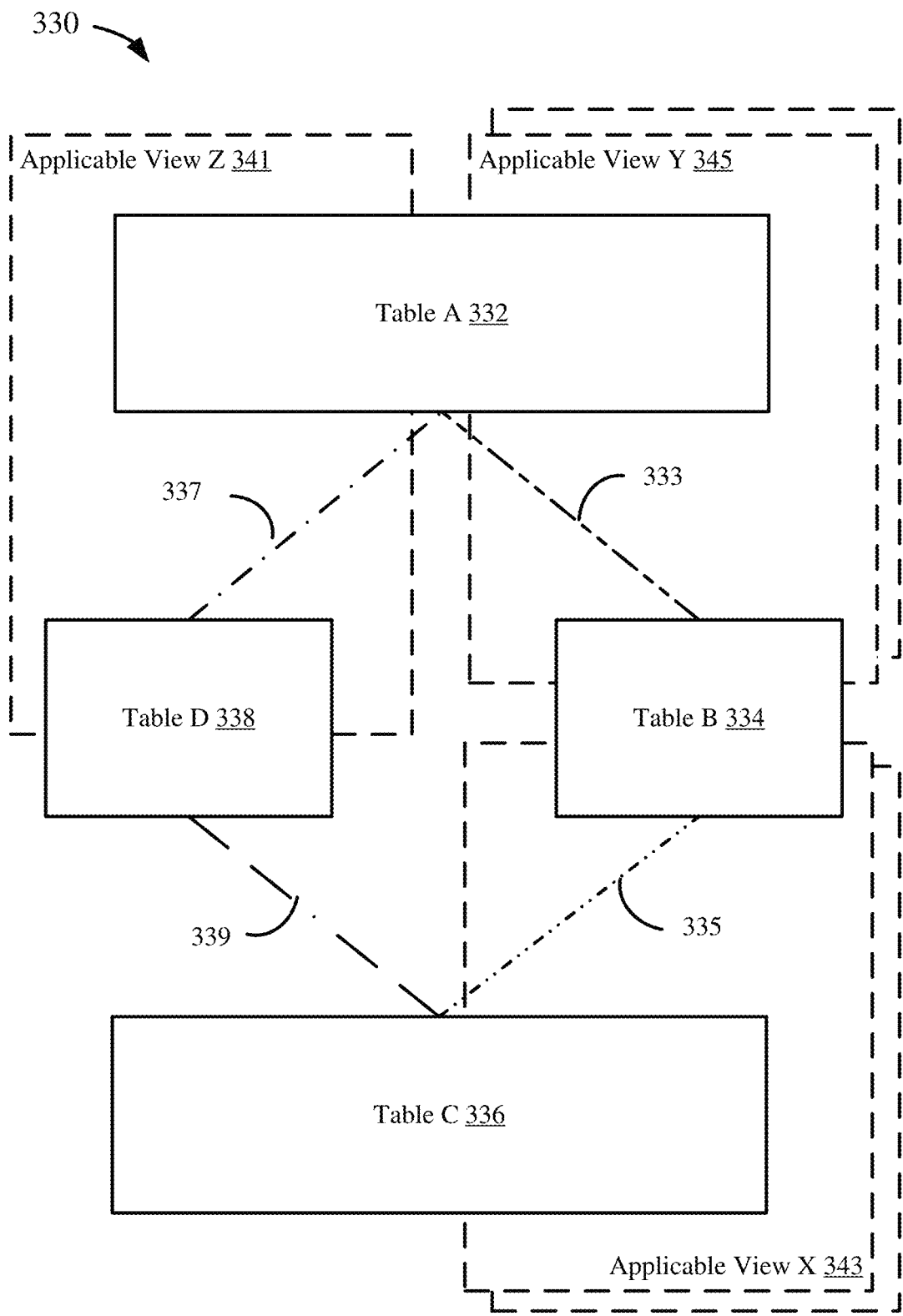
FIG. 3B illustrates an example set of views, data objects, and paths for use in view building with incomplete paths.

FIG. 3B illustrates an example 330 set of views, data objects (tables), and paths for use in view building with incomplete paths, such as by the process 300 shown in FIG. 3A. A request may be made (e.g. at 302 in FIG. 3A) to combine two tables, Table A 332 and Table C 336 within a database or data model.

Several applicable views 341, 343, 345 may be identified (e.g. at 304 in FIG. 3A) that contain either Table A 332 or Table C 336. Generally, the views contain references to the tables, or data pulled from the tables, but not the tables themselves. Applicable View Z 341 may contain Table A 332 and Table D 338, having relationship or path 337; Applicable View X 343 (and additional views) may contain Table B 334 and Table C 336, having relationship or path 335; Applicable View Y 345 (and additional views) may contain Table B 334 and Table A 332, having relationship or path 333. These views 341, 343, 345 may also contain other tables or database objects in addition to those illustrated.

Table C 336 and Table D 338 may have relationship or path 339, which may not be implemented in a view but may be identified from a data dictionary or other definitional object (e.g. the tables themselves or a graphical representation of existing views). For this example 330, path 339 may alternatively be considered to be in a view that is none of the shown views 341, 343, 345. In some embodiments, paths that are not implemented in views, even if known or otherwise identified in the database, may be excluded and not used (e.g. a path not implemented in at least one view may be considered to be a less useful or efficient path because it hasn't been implemented previously).

The paths 333, 335, 337, 339 may be identified as partial paths (e.g. at 306 in FIG. 3A) because each path connects at least one of the requested Tables A 332 or C 336. A first partial path identified may be the path in Applicable View Z 341, which is the relationship 337 from Table A 332 to Table D 338. Path 337 may be represented as A->D, A;D, A:D, AD, or some other ordered set (e.g. variables in an array, linked list, or other data structure). The path 337 may include specific fields from the tables 332, 338 which form the relationships 337, such as foreign keys or associations.

A second partial path identified may be the path 339 from Table D 338 to Table C 336. Path 339 may be represented as D->C, D;C, D:C, DC, or some other ordered set (e.g. variables in an array, linked list, or other data structure). The path 339 may include specific fields from the tables 338, 336 which form the relationship 339, such as foreign keys or associations.

A third partial path identified may be the path 333 combining Table A 332 with Table B 334. Path 333 may be represented as A->B, A;B, A:B, AB, or some other ordered set (e.g. variables in an array, linked list, or other data structure). The path 333 may include specific fields from the tables 332, 334 which form the relationship 333, such as foreign keys or associations.

A fourth partial path identified may be the path 335 combining Table B 334 with Table C 336. Path 335 may be represented as B->C, B;C, B:C, BC, or some other ordered set (e.g. variables in an array, linked list, or other data structure). The path 335 may include specific fields from the tables 334, 336 which form the relationship 335, such as foreign keys.

Paths 333 and 335 may be identified as each being used in multiple views.

A number of times a path, such as AB or BC, is found in the applicable views may be counted (e.g. at 308 in FIG. 3A). The number of times a particular path is used in the existing views may indicate the usefulness or effectiveness of the path (as in, the more a path was used previously by being coded into a view, the more likely that path is better to use). Thus, the partial path AB 333 may have a frequency of 10 if found in use in 10 views, while partial path BC 335 may have a frequency of 4 if found in 4 views. Further, partial path AD may have a frequency of 1 and partial path DC may have a frequency of 0.

A score for each partial path may be calculated using a scoring function (e.g. at 310 in FIG. 3A). For example, the scoring function may be 1−1/frequency. As higher frequency may be considered an indicator of a better or more preferred path, a score is better (with this formula) as it increases and worse as it decreases. Thus, the score for path AB may be 0.9 (1−1/100), while the score for path BC may be 0.75, the score for path AD may be 0, and the score for path DC may be set to 0 (or −1, or some other low value based on the frequency of zero calculating as 1−1/0).

The partial paths may be combined to generate composed paths that link Tables A 332 and C 336 (e.g. at 312 in FIG. 3A). Partial path AB 333 may be combined with partial path BC 335 to form a composed path ABC. The scores of the partial paths may be simply added together for a total score for the path ABC, which is 1.65. Partial path AD 337 may be combined with partial path DC 339 to form a composed path ADC with a score of 0 (or −1, or some other predetermined value for paths with incalculable or non-standard values, which may include removing the path as an option).

These composed path results of a request to combine Table A 332 with Table C 336 may thus be paths (with scores counts) A->B->C (1.65) and A->D->C (0). Generally, ABC may be considered the preferred (or lowest cost or "shortest") path given the higher score.

Such results may be provided, such as in a user interface (e.g. at 314 in FIG. 3A) or may be selected from automatically (e.g. at 318 in FIG. 3A). If automatically selected based on score, path A->B->C may be selected as it has the better (e.g. higher) score. Once this path is known and selected, a view may be automatically generated, or developed by a user, based on the selected path (e.g. at 320 in FIG. 3A).

With an alternative scoring function, such as 1−frequency/10, a low score may be preferred. In this example 330 with this formula, the score for AB would be 0, for BC would be 0.6, for AD would be 0.9, and for DC would be 1. Thus, the total score for ABC would be 0.6 and the total score for ADC would be 1.9, which generally would make the path ABC be deemed the preferred (or "shortest") path.

Example 8—View Mining Using Graph Representation

View mining, as disclosed herein, may be executed against graph representations of views in a database. In a graph representation, a given database model or schema may be represented as a graph, where individual tables can be represented as nodes or vertexes in the graph, and relationships between tables can be represented as edges. View mining may include traversing these nodes and identifying relevant edges.

In at least some aspects, one or more of the tables are connected by multiple edges. For example, multiple pathways between selected database objects may exist through a single set of one or more attributes of a table (e.g., one or more tables may use the single set as a foreign key or an association to an alternate key). Or, pathways may exist through different sets of one or more table attributes (e.g., one table can use a foreign key and another table can use an association to an alternate key).

A path determination method can determine paths between tables during view mining, and may include information regarding edges particular sets of one or more attributes in each of the two connected tables. Utilizing a graph representation may allow for a larger number of paths to be analyzed, and may include more granular path information, which can increase efficiency by allowing a view builder to select paths with a reduced number of nodes needed for a query, or otherwise choose a path that increases efficiency or best suits requested criteria.

The availability of multiple paths can increase efficiency by allowing tables to be chosen that can most efficiently be searched. For example, a longer path that includes tables with a smaller number of records may be more efficient than a shorter path that includes a larger number of records. Or, tables can be chosen because they are located in physically proximity (e.g., on the same computing node/server) or on a node/server with faster performance compared with other nodes/servers.

Tables in a particular path can also be chosen based on other considerations, such as to reduce privacy or security concerns. For example, if one path accesses a table with confidential or protected data, it may be preferable to choose a path that does not include such data. In other cases, it may be preferable to choose a path that does include a certain table. For example, if it is known that including a certain table in a path produces an efficient result compared with other options, it may be desirable that any paths to be further considered require that path. Stated another way, the disclosed technologies can incorporate a "black list," where certain nodes may not be on a selected path, and/or a "white list," where certain nodes must be on a final path.

Example 9—Graph Representation of Database Objects and Graph Traversal

Figure 4A:
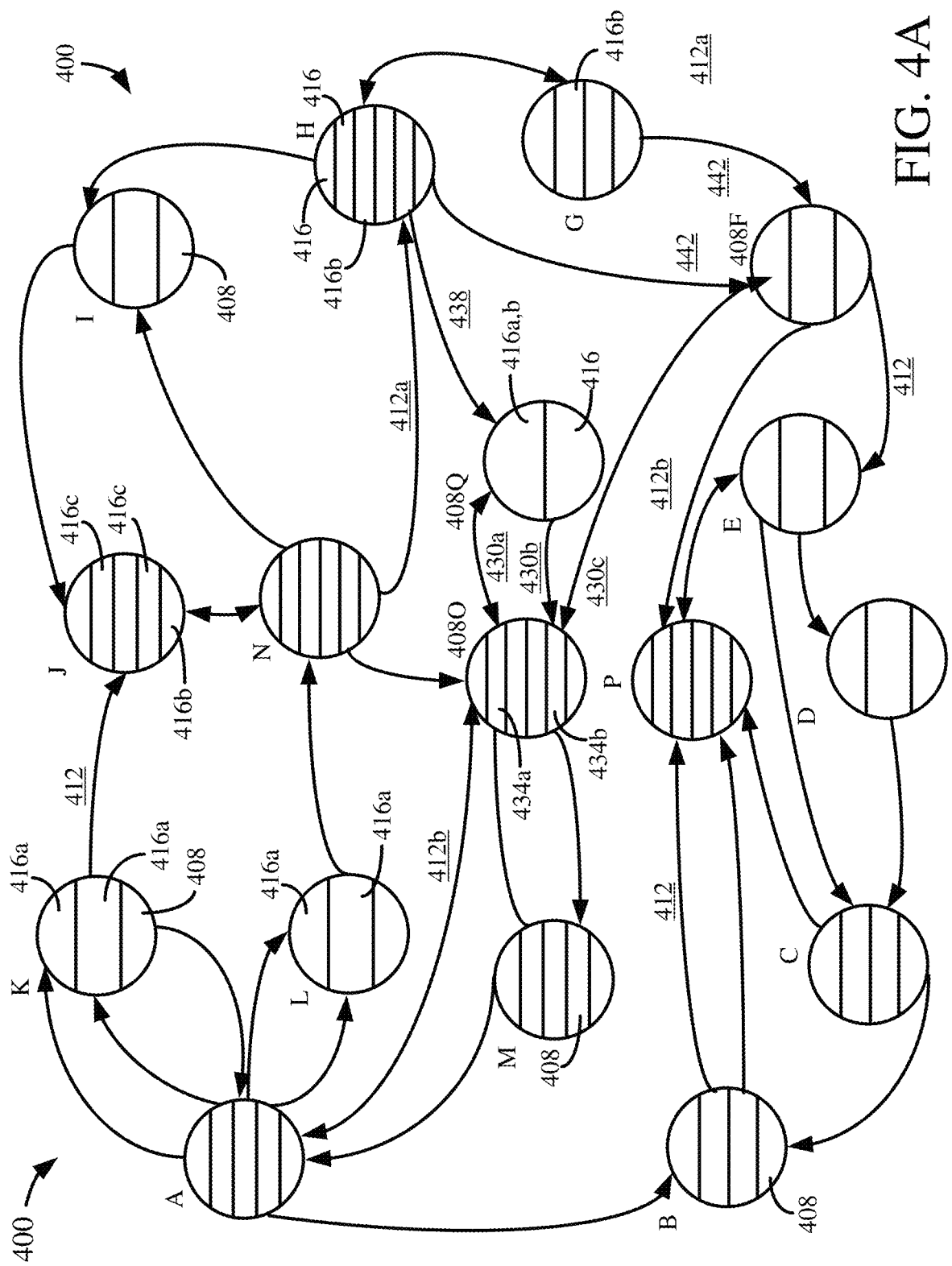
FIG. 4A illustrates a graph representing a view that includes a plurality of nodes.

FIG. 4A illustrates a graph 400 that includes a plurality of nodes 408, where each node 408 is connected to one or more other nodes through one or more edges 412. Edges 412 may be bidirectional or unidirectional. The nodes 408 can represent data sources, such as tables in a relational database. The edges 412 can represent relationships between tables. For example, an edge 412 can represent a primary-foreign key relationship, an association-alternate key relationship, or some other relationship.

Each of the nodes 408 is segmented into multiple sections 416. Each section 416 can represent a different attribute (or column or field) of a table. Some of the sections 416, such as sections 416a, can be unidirectionally connected to one or more attributes of one or more other nodes 408. Other sections, such as sections 416b, can be bidirectionally connected to one or more attributes of one or more other nodes 408 (e.g., an attribute can be both a foreign key or association and a primary key or alternate key). Additional sections 416, such as sections 416c, are not (at least currently) connected to other nodes 408.

In at least some aspects, unidirectional edges, such as edges 412a, can allow a node 408 connected to the tail of an edge to retrieve information from the node connected to the head of the edge. For unidirectional edges 412a, the node 408 connected to the head is typically not able to retrieve information from the node at the tail, at least not through that edge.

For example, a node 408 connected to the head may have a primary key that is an attribute 416 that serves as a foreign key for a node connected to the tail of the edge 412a (or similarly, edge 412b from node 408F to node P). The primary key serves to uniquely identify data (e.g., rows, records, or tuples of a relational database table) of the node 408 proximate the head. However, in at least some cases, the primary key of the source node 408 does not uniquely identify data of the target node, the node proximate the tail.

In some cases, the primary key of the source node 408 (which can be a target node that is a starting point for a path) can uniquely identify data of a destination node (which can be a target node that is a destination or ending point for a path), such as when the primary key of the source node is also the primary key or an alternate key of the destination. Additionally, in some aspects, although the foreign key used by a node 408 may not be a primary key, it may be part of a super key (including a candidate key, which can be the primary key), or alternate key, of the node.

The primary key (or other type of key) of a node 408 may include attributes that reference attributes of multiple other nodes. For example, the primary key of a node 408 may include a first attribute from a first referenced node, such as using a foreign key or an association to an alternate key of such node, and a second attribute from a second referenced node, such as a foreign key or an association to an alternate key of such second referenced node.

Figure 4B:
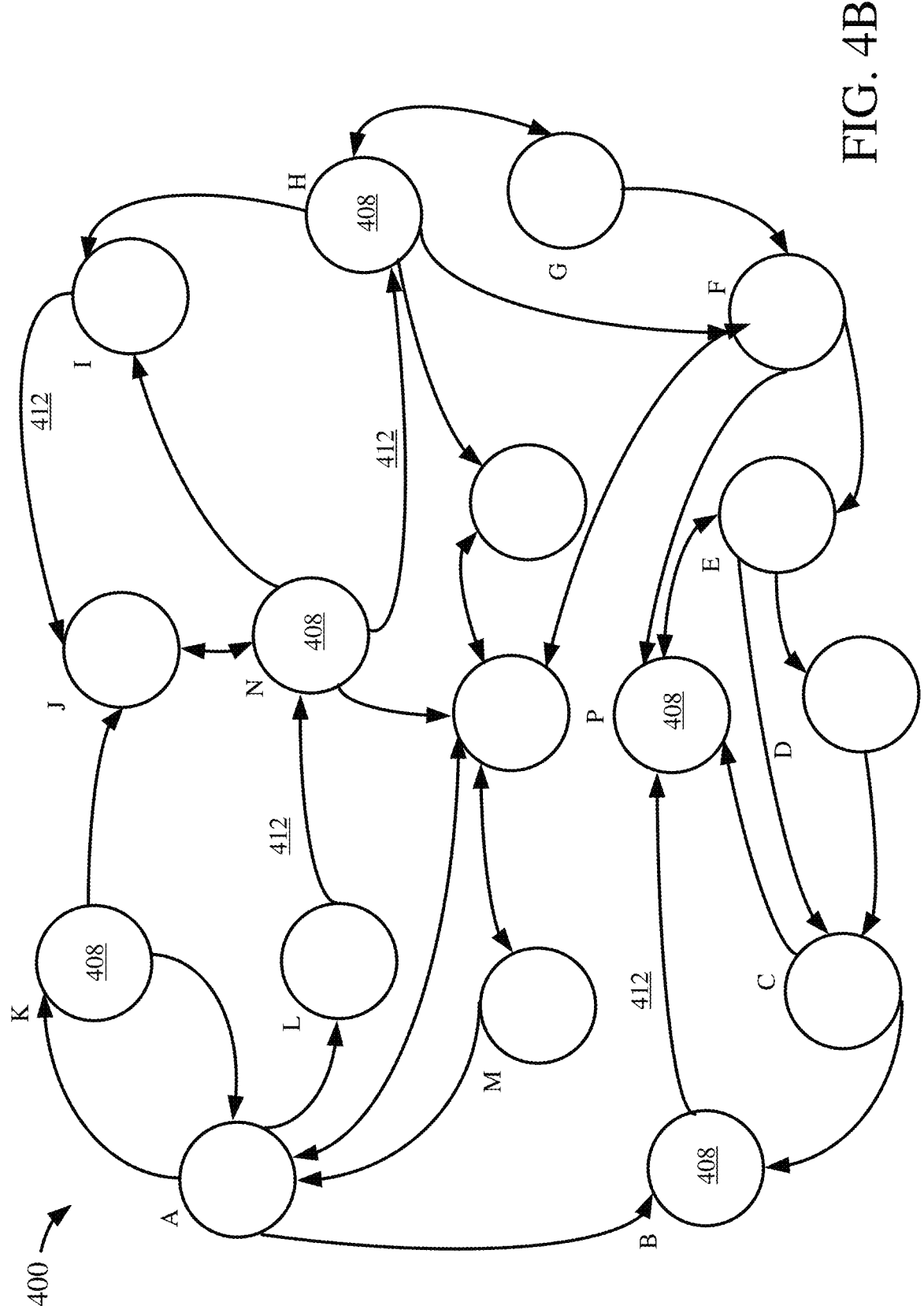
FIG. 4B illustrates seventeen nodes in a graph representing a view.

FIG. 4B illustrates seventeen nodes 408. For large database systems, such as are common for ERP applications, the number of nodes may be orders of magnitude larger. However, even for the comparatively small number of nodes 408 in FIG. 4, it can be seen that multiple pathways exist between any given node 408. As has been described, even for someone with knowledge of the nodes 408 and their relationships, it can be difficult to determine a route, all routes, or a best route between two nodes, at least if the nodes are not directly connected.

Disclosed technologies can assist in identifying one or more pathways for obtaining data from at least a first node 408 and at least a second node. Pathways can be identified by representing nodes in a data structure, such as a graph data structure that includes the nodes 408 and connecting edges 412. In some cases, the edges 412 can have one or more weights (e.g., a weight value, a vector of weight values, or a composite or abstract data type that includes one or more values). Weights can represent costs, such as network, memory, or CPU costs that would be incurred, a number of tuples processed, query complexity, or other measures of edge (and therefore path) desirability. In other cases, pathways can be determined without the use of weights.

In particular aspects, a graph traversal method is used to determine one or more paths between two or more specified nodes 408. In some cases, the traversal can determine all paths, while in other cases the traversal method can determine a subset of paths, such as a shortest path (where shortest can refer to a smallest number of nodes traversed or smallest with respect to one or more weights, or a cost function that includes multiple weights). In a particular example, a depth-first search is used to determine paths between two given nodes. In a more particular example, the depth-first search considers a single edge between pairs of nodes in a prospective path, even if multiple edges exist when considered at attribute-level granularity. Once paths are determined, attribute-level edge information can be added to the path information so that such edge information is not lost.

To illustrate how different edges 412 can be used to distinguish paths, in FIG. 4A, a node 4080 is connected to a node 408Q by edge 430a. Edge 430a connects to attribute 434a of node 4080. Attribute 434b is connected to nodes 408Q and 408F by edges 430b and 430c, respectively. If node 4080 is a terminating or target node in the path (e.g., the starting or ending node), a path through edge 430a would not be considered equivalent to a path through edge 430b, because the edges connect to different attributes of node 4080. Among other things, a request to retrieve or modify data, such as a SQL statement, would typically be constructed differently depending on whether attribute 434a or attribute 434b was being accessed (e.g., SELECT . . . WHERE ATTRIBUTE434A=VALUE versus SELECT . . . WHERE ATTRIBUTE434B=VALUE).

Similarly, if node 4080 was not a terminating node, paths through edges 430a or 430b, 430c would not be considered equivalent, at least in a final path determination, or when operations are generated to define a particular path (e.g., one or more SQL statements). First, other portions of the paths would typically be different. For example, traversing edge 430a would require a path that includes edge 438. Traversing edge 430c would require a path that includes one of edges 442. So, a path through edge 438 may have a different length (e.g., number of nodes) or cost than a path through an edge 442. Second, operations to access data, such as SQL statements, via the paths would be different.

Graph traversal algorithms typically assume that edges 412 between nodes 408 are equivalent. That is, if an edge accesses a first node, that access is equivalent to the access of an edge from any other second node that accesses the first node. Similarly, typical traversal methods assume that two nodes are connected by one edge (which could be unidirectional or bidirectional). In the event these conditions hold true, such typical graph traversal methods can be used, as well as other methods, such as Dijkstra's algorithm or the use of spanning trees (including minimum spanning trees) can be used for path calculations. However, in at least some cases, a traversal method is used that finds more than just the shortest available path, such as all paths, or a subset of all paths that includes more than a single path, including a subset of paths that are noncyclical or which satisfy other constraints (e.g., cost constraints, constraints on which nodes may or may not be in a path). Once paths are determined, attribute-level edge information can be added to the paths.

Pseudocode for a suitable traversal method is:

---

Start at the first target node (e.g., a starting node for the path);
Get a list of all nodes immediately reachable from the first target node;
Call the depth-first search method recursively for each node of the list;
 If the node is the second target node, mark all nodes in the found path
 as searched (such as using a flag or Boolean value);
 If the node has the calculated flag set, save the current path, and return
 to the previous node in the path;
 Otherwise, traverse all nodes connected to the current node;
Remove all nodes that are not part of a saved path; and
Add all possible edges between the nodes.

---

In some cases, such as using the above pseudocode, a path finding method can determine a set of nodes that are reachable without considering how they are reachable. That is, a first connection to a node through a first edge to a first attribute is considered to be equivalent to a second connection to the node through a second edge to a second attribute. Once the set of reachable nodes has been determined, the edges between the nodes can be added. A visual depiction of the graph can be provided to a user, and the user may visualize how a given path may involve connections to different attributes of a particular table.

FIG. 4B illustrates the graph of 400 showing edges 412 between nodes 408, where it is not considered to which attribute(s) an edge connects, and multiple edges between nodes are reduced to a single edge. The above pseudocode can be used to determine paths between nodes. When the paths are to be displayed to a user, the individual edges between attributes can be added in to provide information as shown in FIG. 4A. The user can then determine which of the available paths are more suitable for their purposes, including considering which paths involve the fewest number of nodes, which paths may be more efficient, and paths that may include nodes that have information that may be of interest for a particular purpose (e.g., will be retrieved in a query that traverses the path).

In other aspects, a path determination method can distinguish between different edges to a particular node. For example, assume a node A has a first edge to a first attribute of a node B and a second edge to second attribute of node B. A path from node A to node B through the first edge can be considered different than a path from node A to node B through the second edge.

In some cases, a user can supply path constraints. For example, a user can specify nodes that must be on a path or that must not be on a path. Required nodes can be in the form of a white list prior to an initial path determination, or can be provided by a user (and added to a white list) after an initial path termination. Similarly, prohibited nodes can be provided in the form of a black list prior to initial path determination, or can be provided to a user (and added to a black list) after initial path determination. After an initial path has been determined, nodes can be indicated as required or prohibited in response to user input provided using a display of a current graph of nodes and their interconnections.

When a user selects one or more nodes to be required or prohibited, the paths between nodes can be recalculated and an updated graph, typically with fewer paths, and potentially fewer nodes, can be displayed to a user. The user can interactively designate nodes to be required or prohibited to reduce the number of paths displayed. The user can select a final path, which can result in the generation of operations, such as SQL statements, to implement the chosen path.

In typical traversal methods, nodes are not visited multiple times. However, in some aspects, a traversal method can visit a node multiple times. Visiting a node multiple times can be allowed, in some cases, when multiple edges exist to the node. Visiting a node multiple times can be allowed, in further cases, when a node is required to be on a path.

Consider a set of nodes A, B, C, M, and Z. Assume node A is connected to node B, node B is connected to node C, node C is connected to nodes M and Z, and node M is connected to node Z. If multiple visits to a node are not allowed, and node M is a required node, no path exists from node A to node Z, because the only way to node Z is through node C, and node C must be reached to visit node M. However, if multiple visits to a node are allowed, and node M is a required node, a path does exist from node A to node Z, although it involves node C being visited twice—from node B to node C and from node M to node C. In further aspects, a node can be visited multiple times so long as the visits occur through different attributes. For instance, in the above example, multiple visits to node C may be allowed if the edge from B to C connects to a first attribute of node C and the edge from M to C connects to a second attribute of node C.

As mentioned, in some cases, intermediate nodes can be specified as being required for a valid path or being excluded from a valid path. In one example, when a node is specified as being required, candidate paths are evaluated. When a candidate path is determined to connect a first target and a second target node (i.e., the endpoints of the path), it is determined whether the path includes all intermediate nodes that are required for a valid path (e.g., all nodes on a white list). If it does, the path is selected as a possible path and saved. If not, the path is discarded. However, sufficient path information can be saved (e.g., a flag is set) such that the same path is not reevaluated for a particular path determination instance.

In another example, when a particular node is specified as being prohibited for a valid path, calculation of a particular path stops as soon as a node is encountered that is on the list of prohibited nodes, or black list. That is, the path finding method does not iterate over nodes on the black list. In this way, no paths indicated as valid will include a prohibited node. In other aspects, black listed nodes are just remove from the set of available nodes.

Example 10—Example Graph Representations

Figure 4C:
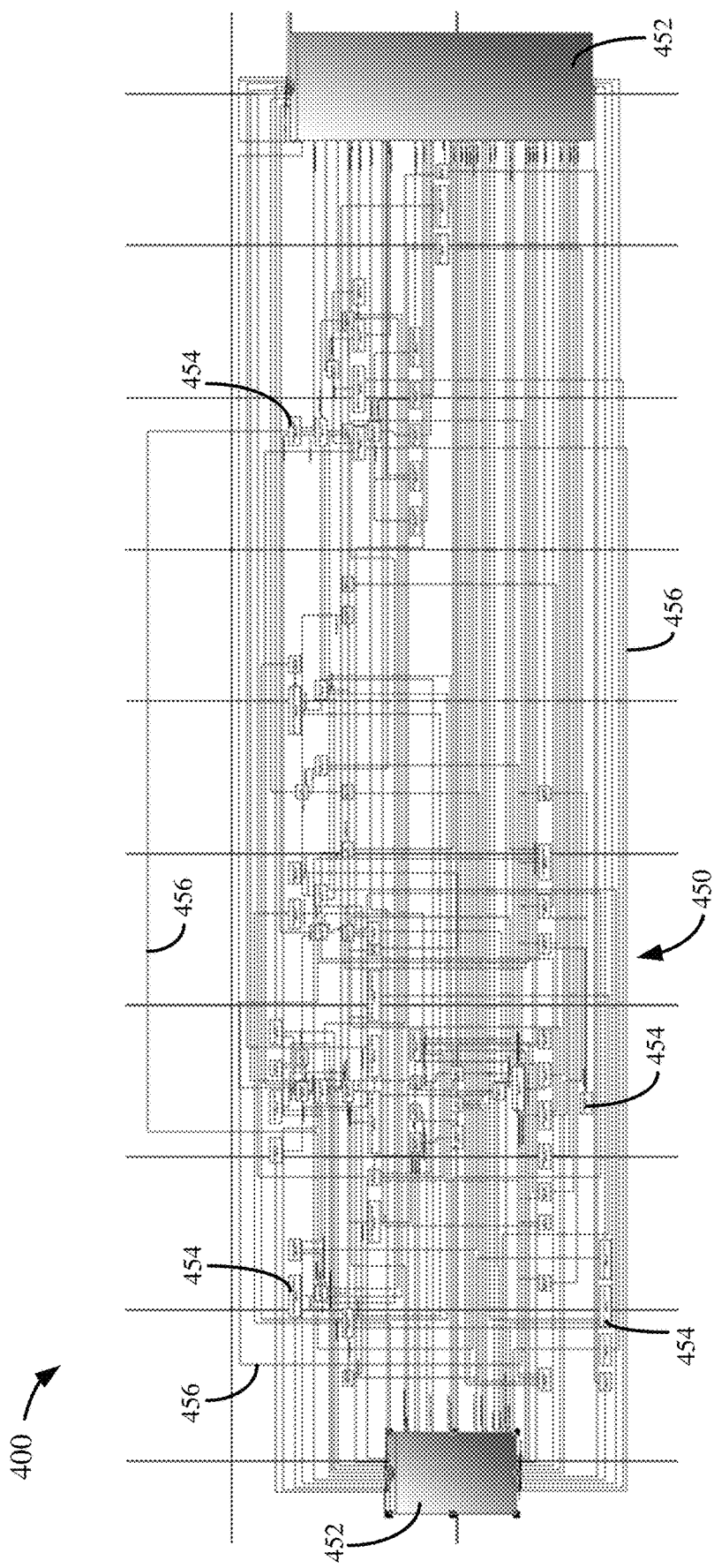
FIG. 4C illustrates a graph representation of a view with target tables and connecting tables.
Figure 4D:
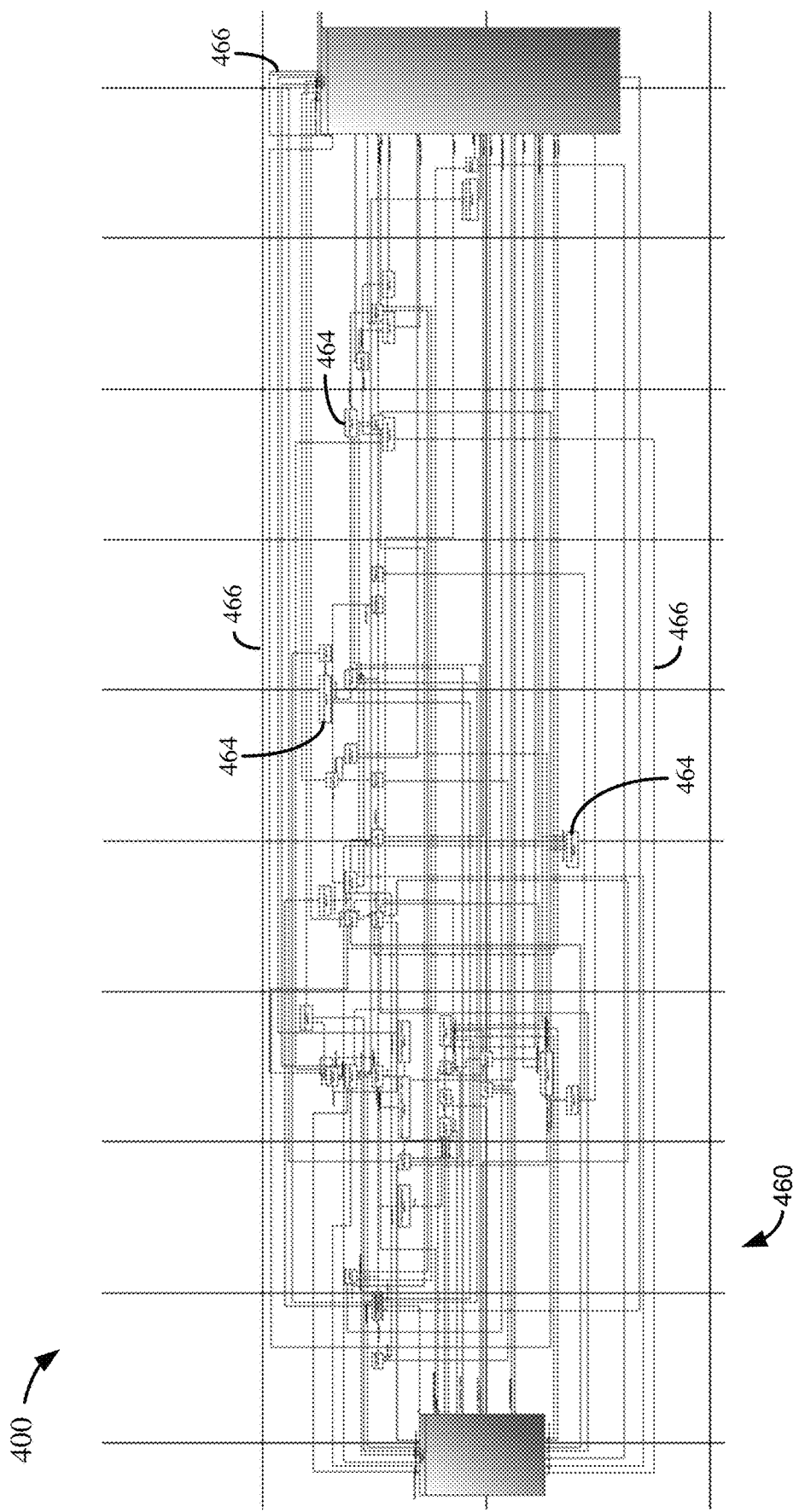
FIG. 4D illustrates a graph representation of a view with additional target tables and connecting tables.
Figure 4E:
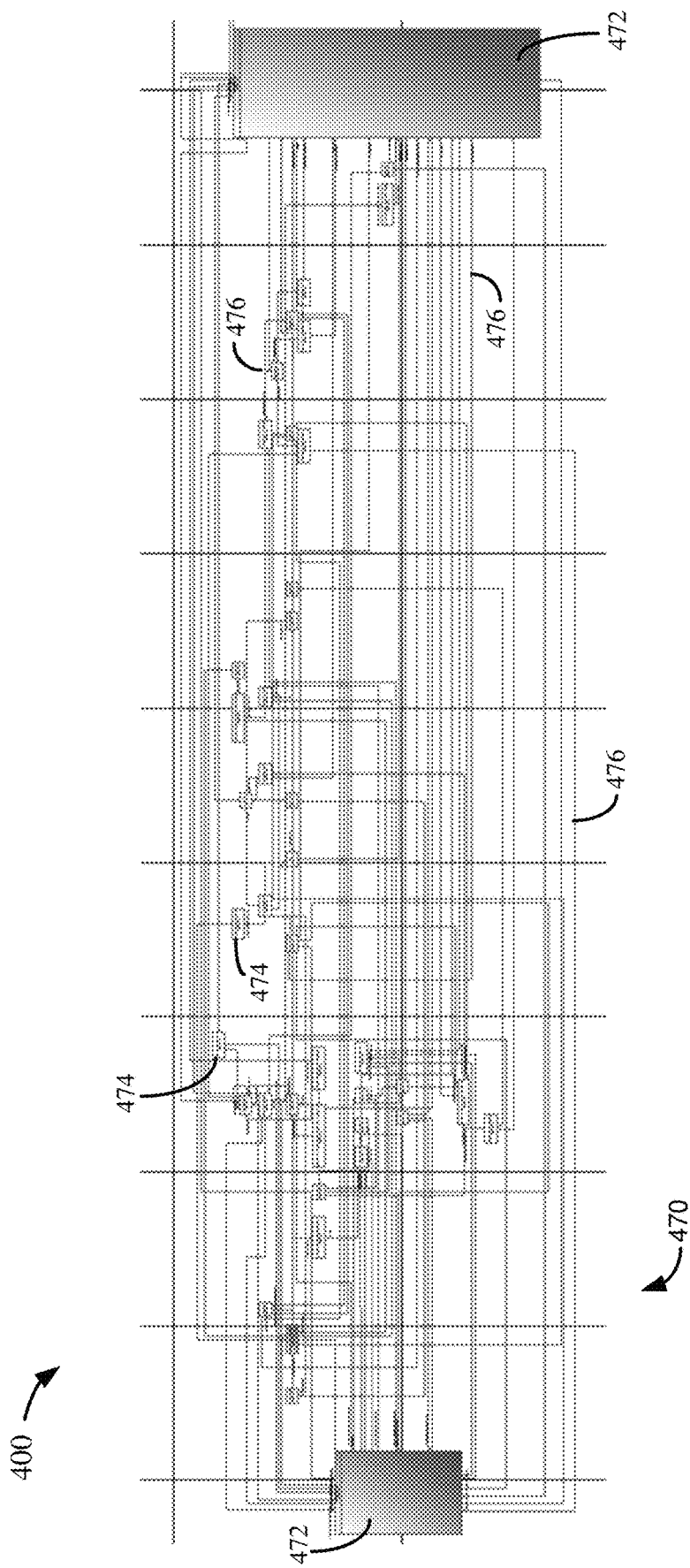
FIG. 4E illustrates a graph representation of a view with additional target tables, restricted tables, and connecting tables.

FIGS. 4C-E present example graph representations which may be mined for automatic view generation or recommendation as described herein. These examples may also be provided as visualizations in a user interface, which can allow a user to visualize paths between nodes, obtain path information (for example, nodes visited, node attributes accessed, and example operations for the path, such as SQL statements to implement the path), and better understand the automatically generated or recommended views.

FIG. 4C illustrates a graph 450 of target tables 452 (e.g., tables having one or more attributes from which data is to be retrieved) and connecting tables 454. Connections 456 link pairs of target tables 452, connecting table 454, or combinations thereof. The graph 450 can include 80 tables from which connections 456 and pathways can be formed.

Each connection 456 typically indicates a unique edge in a path between the target tables 452 (e.g., between particular sets of one or more attributes of the tables connected by the edge). In some aspects, as a connection 456 is mined, the corresponding path or paths associated with the connection is added to a set or list of mined paths (e.g. stored in a variable).

FIG. 4D illustrates a graph 460 that can be similar to the graph 450 of FIG. 4C. However, in FIG. 4D, a single table has been added to a list or request of required tables. It can be seen that the number of connections 466, and consequently pathways, has been greatly reduced compared with FIG. 4C. For example, while the graph 450 can have 80 tables, the graph 460 can have 44 tables 464—a reduction of almost half merely by requesting a single table as required.

Similarly, FIG. 4E illustrates a graph 470, which can be similar to the graph 450 of FIG. 4C. In the graph 470, a single table was added to a list of prohibited tables (e.g. exclusionary criteria when combining requested tables). Again, the number of connections 476 and intermediate tables 474, and consequently pathways, between target tables 472 has been greatly reduced compared with FIG. 4C. For example, while the graph 450 can have 80 tables, the graph 470 can have 42 tables—a reduction of almost half merely by marking a single table as prohibited.

Example 11—View Builder Module Environments

Figure 5A:
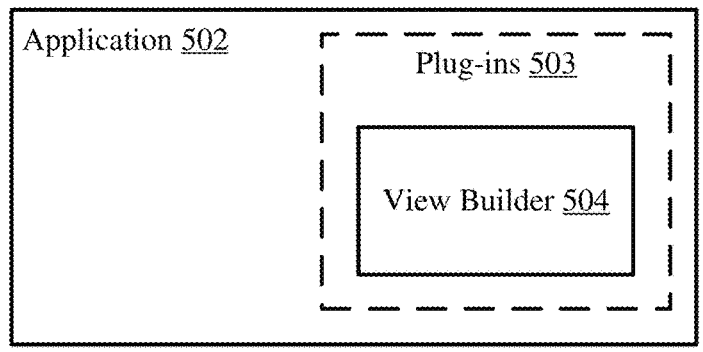
FIG. 5A is a schematic diagram depicting an application environment for a view builder module.

FIG. 5A is a schematic diagram depicting an application environment for a view builder module 504, which may provide view building or view mining functionality as described herein. An application 502, such as a software application running in a computing environment, may have one or more plug-ins 503 (or add-ins or other software extensions to programs) that add functionality to, or otherwise enhance, the application. The view builder module 504 may be integrated with the application 502; for example, the view builder module may be integrated as a plug-in. The view builder 504 may add functionality to the application 502 for mining views for data object relations with which to build views, which may be displayed in a user interface. For example, the application 502 may be a software development or database management application, and the view builder may be integrated with the development or management application to provide recommended views or automatically generated views.

Figure 5B:
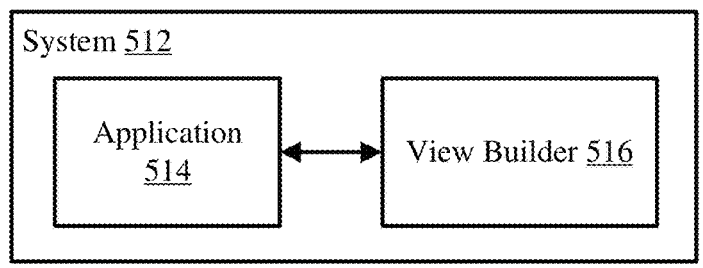
FIG. 5B is a schematic diagram depicting a system environment for a view builder module.

FIG. 5B is a schematic diagram depicting a system environment for a view builder module 516, which may provide view building or view mining functionality as described herein. The view builder module 516 may be integrated with a computer system 512. The computer system 512 may include an operating system, or otherwise be a software platform, and the view builder module 516 may be an application or service running in the operating system or platform, or the view builder module may be integrated within the operating system or platform as a service or functionality provided through the operating system or platform. The system 512 may be a server or other networked computer or file system. Additionally or alternatively, the view builder module 516 may communicate with and provide view building or view mining functionality, as described herein, to one or more applications 514, such as software development or database management application, in the system 512.

Figure 5C:
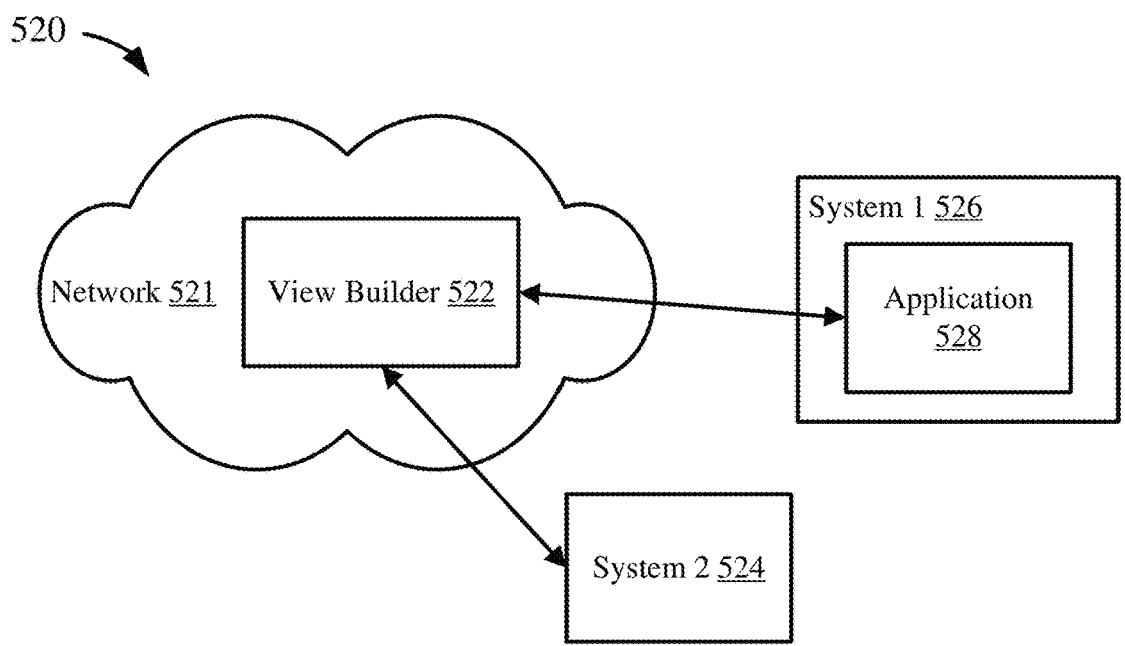
FIG. 5C is a schematic diagram depicting a network environment for a view builder module.
Figure 6A:
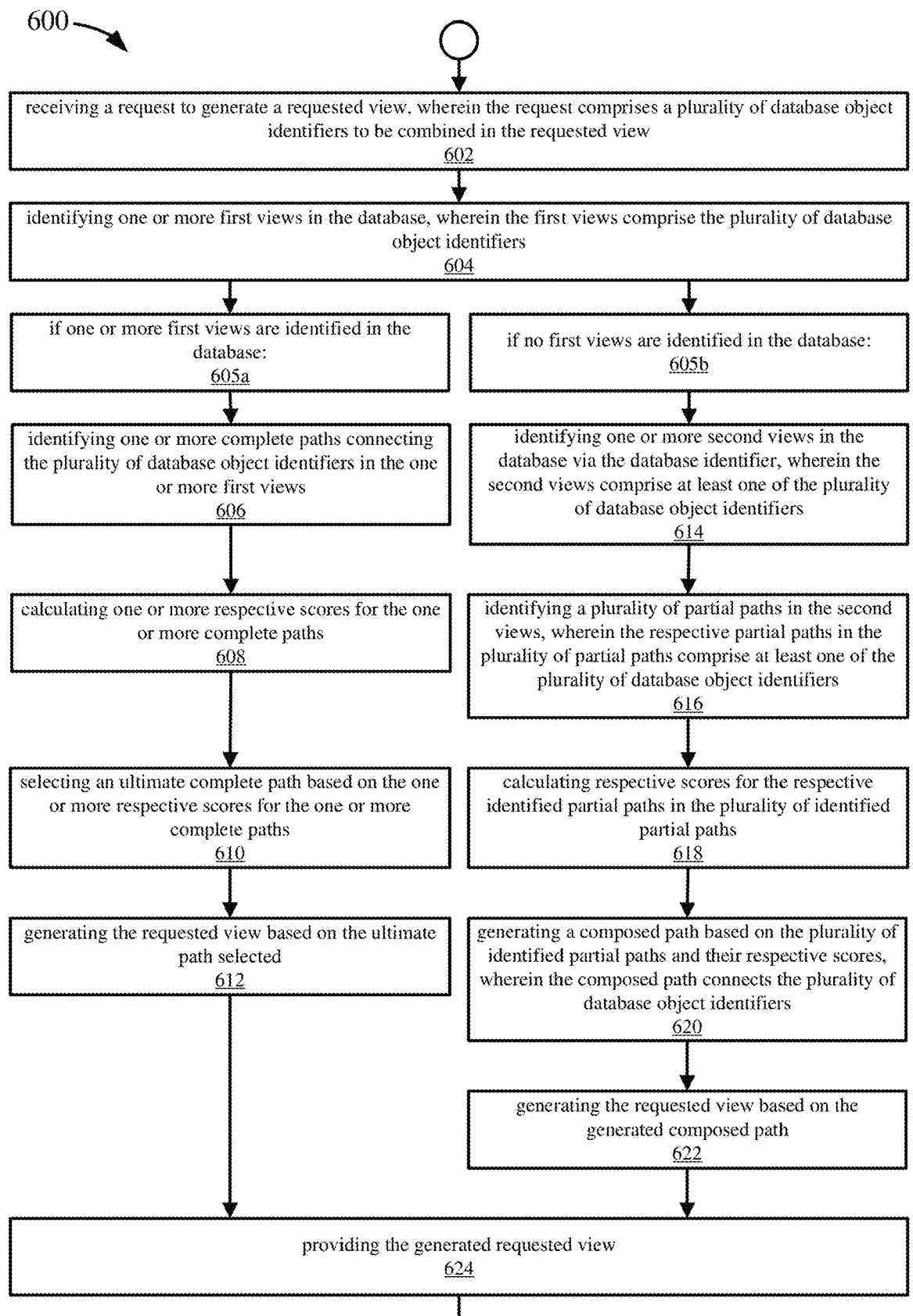
FIG. 6A is a flowchart illustrating a process for automatic view generation.
Figure 6B:
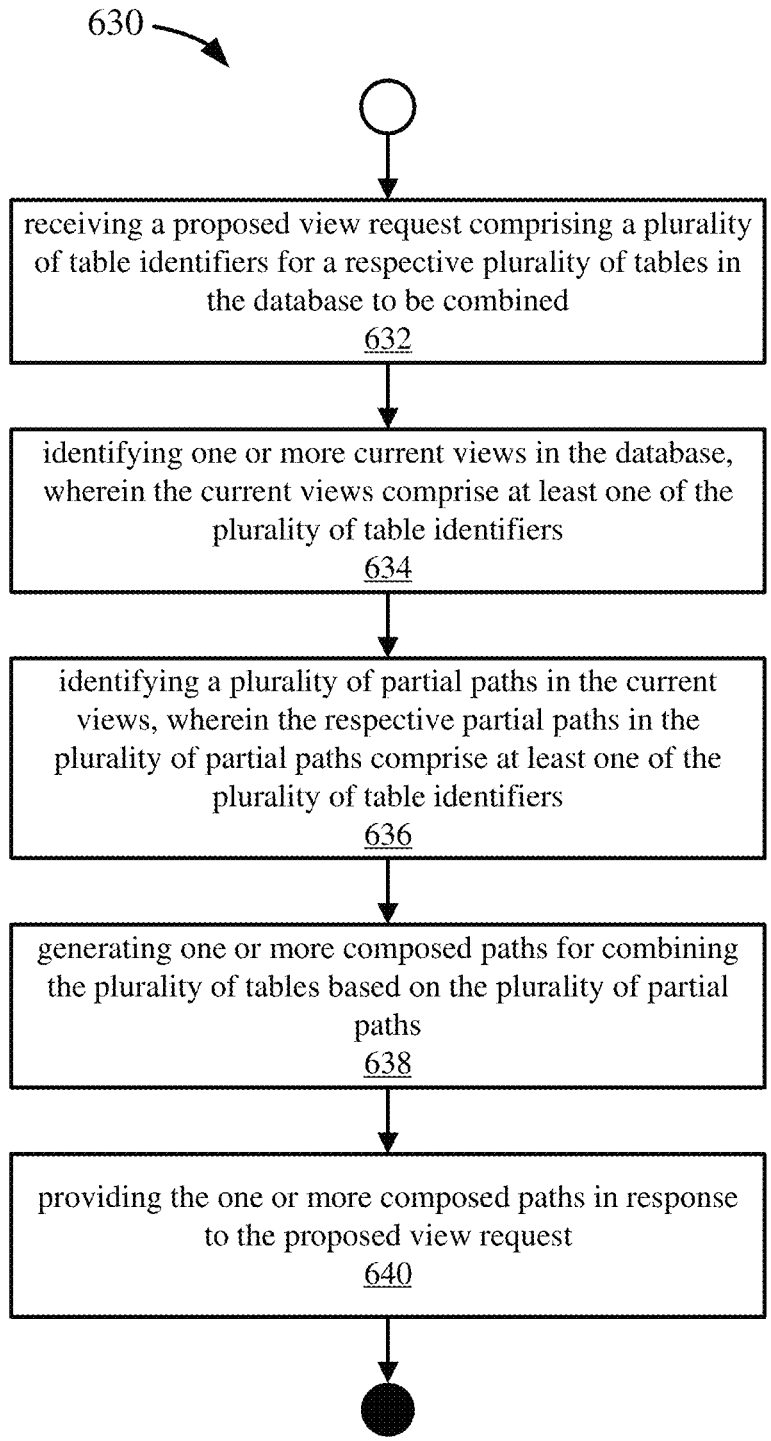
FIG. 6B is a flowchart illustrating a process for generating a proposed view in a database.
Figure 6C:
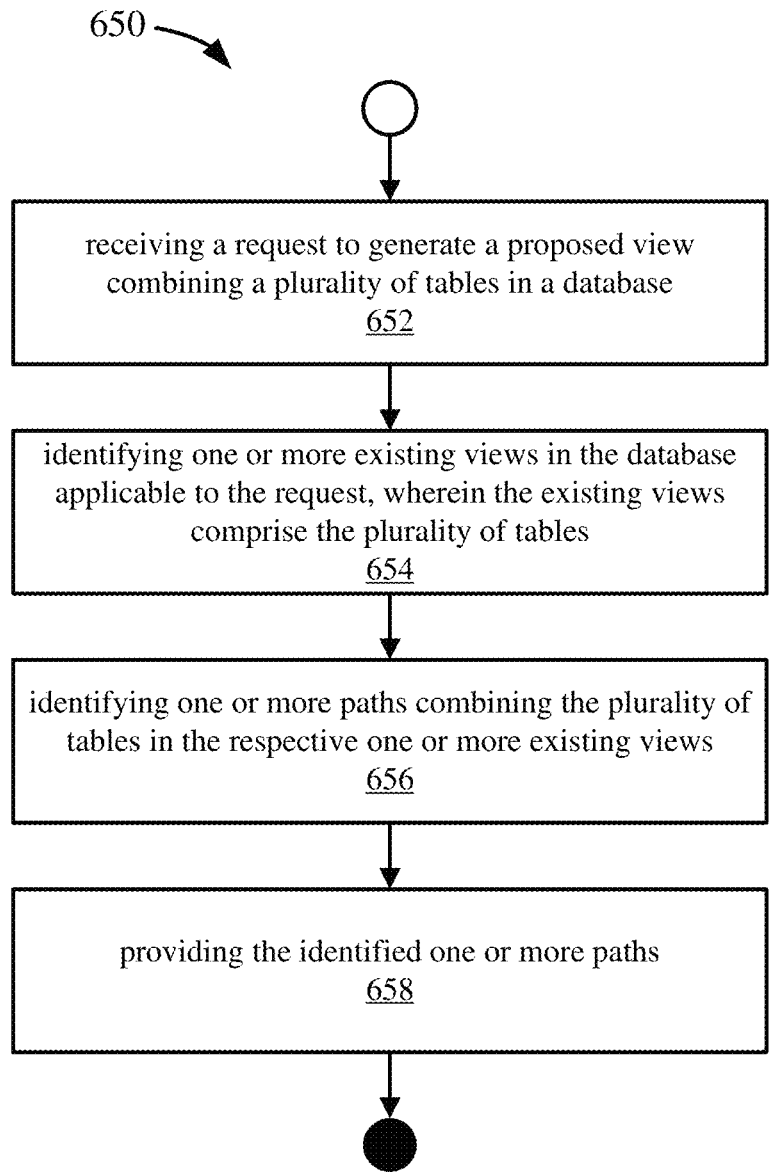
FIG. 6C is a flowchart illustrating a process for providing one or more proposed views.

FIG. 5C is a schematic diagram depicting a network environment 520 for a view builder module 522, which may provide view building or view mining functionality as described herein. The view builder module 522 may be available on a network 521, or integrated with a system (such as from FIG. 5B) on a network. Such a network 521 may be a cloud network or a local network. The view builder module 522 may be available as a service to other systems on the network 521 or that have access to the network (e.g., may be on-demand software or SaaS). For example, system 2 524 may be part of, or have access to, the network 521, and so can utilize view building or view mining functionality from the view builder module 522. Additionally, system 1 526, which may be part of or have access to the network 521, may have one or more applications, such as application 528, that may utilize view building or view mining functionality from the view builder module 522.

In these ways, the view builder module 504, 516, 522 may be integrated into an application, a system, or a network, to provide view building or view mining functionality as described herein.

Example 12—Additional View Mining Processes

A system for view mining of database views to perform a process 600 for automatic view generation operations is provided herein. A request to generate a requested view may be received at 602. The request may include a plurality of database object identifiers to be combined in the requested view. One or more first views may be identified at 604 in the database. The first views may include the plurality of database object identifiers.

If one or more first views are identified in the database at 605a, the process 600 may perform the following steps. One or more complete paths connecting the plurality of database object identifiers in the one or more first views may be identified at 606. One or more respective scores for the one or more complete paths may be calculated at 608. An ultimate complete path may be selected at 610 based on the one or more respective scores for the one or more complete paths. The requested view may be generated at 612 based on the ultimate path selected.

If no first views are identified in the database at 605*b*, the process 600 may perform the following steps. One or more second views may be identified at 614 in the database via the database identifier. The second views may include at least one of the plurality of database object identifiers. A plurality of partial paths may be identified at 616 in the second views. The respective partial paths in the plurality of partial paths may include at least one of the plurality of database object identifiers. Respective scores for the respective identified partial paths in the plurality of identified partial paths may be calculated at 618. A composed path may be generated at 620 based on the plurality of identified partial paths and their respective scores. The composed path may connect the plurality of database object identifiers. The requested view may be generated at 622 based on the generated composed path.

The generated requested view for process 600 may be provided at 624.

A method 630 for generating a proposed view in a database is provided herein. A proposed view request may be received at 632, and may include a plurality of table identifiers for a respective plurality of tables in the database to be combined. One or more current views in the database may be identified at 634. The current views may include at least one of the plurality of table identifiers. A plurality of partial paths may be identified at 636 in the current views. The respective partial paths in the plurality of partial paths may include at least one of the plurality of table identifiers. One or more composed paths for combining the plurality of tables may be generated at 638 based on the plurality of partial paths. The one or more composed paths may be provided at 640 in response to the proposed view request.

A method 650 for providing one or more proposed views is provided herein. A request to generate a proposed view combining a plurality of tables in a database may be received at 652. One or more existing views may be identified at 654 in the database applicable to the request. The existing views may include the plurality of tables. One or more paths combining the plurality of tables in the respective one or more existing views may be identified at 656. The identified one or more paths may be provided at 658.

Example 13—Computing Systems

Figure 7:
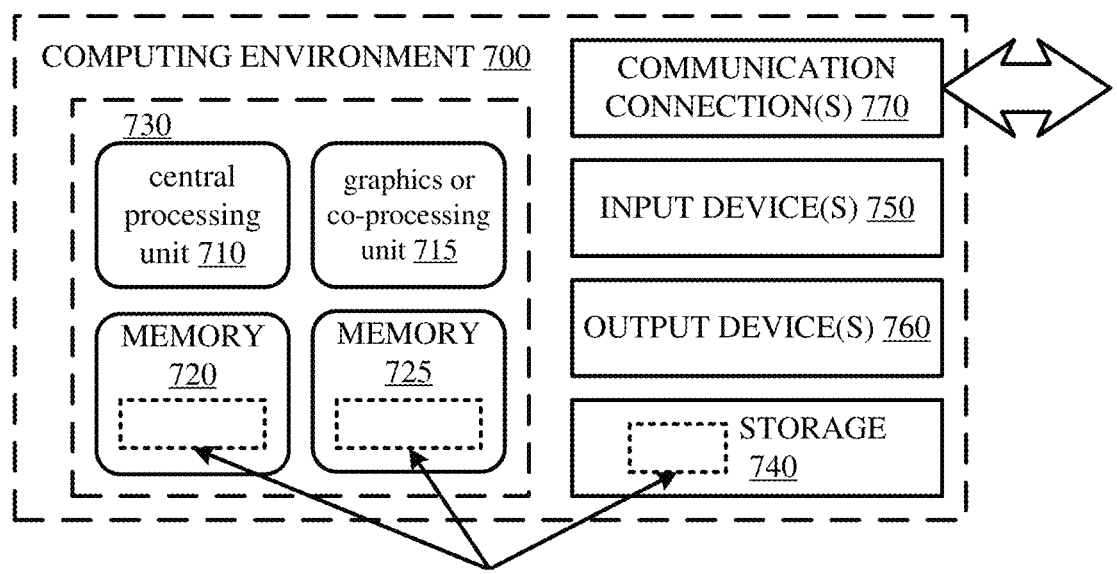
FIG. 7 is a diagram of an example computing system in which described embodiments can be implemented.

FIG. 7 depicts a generalized example of a suitable computing system 700 in which the described innovations may be implemented. The computing system 700 is not intended to suggest any limitation as to scope of use or functionality of the present disclosure, as the innovations may be implemented in diverse general-purpose or special-purpose computing systems.

With reference to FIG. 7, the computing system 700 includes one or more processing units 710, 715 and memory 720, 725. In FIG. 7, this basic configuration 730 is included within a dashed line. The processing units 710, 715 execute computer-executable instructions, such as for implementing components of the processes of FIGS. 2A-B, 3A-B, and 6A-C, the graphs of FIGS. 4A-E, or the systems of FIGS. 1A-B, 5A-C. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 7 shows a central processing unit 710 as well as a graphics processing unit or co-processing unit 715. The tangible memory 720, 725 may be volatile memory (e.g., registers, cache, RAM), non-volatile memory (e.g., ROM, EEPROM, flash memory, etc.), or some combination of the two, accessible by the processing unit(s) 710, 715. The memory 720, 725 stores software 780 implementing one or more innovations described herein, in the form of computer-executable instructions suitable for execution by the processing unit(s) 710, 715. The memory 720, 725, may also store settings or settings characteristics, databases, data sets, or graphs shown in FIGS. 1A-B, 2B, 3B, and 4A-E, systems in FIGS. 1A-B and 5A-C, or the steps of the processes shown in 2A-B, 3A-B, and 6A-C.

A computing system 700 may have additional features. For example, the computing system 700 includes storage 740, one or more input devices 750, one or more output devices 760, and one or more communication connections 770. An interconnection mechanism (not shown) such as a bus, controller, or network interconnects the components of the computing system 700. Typically, operating system software (not shown) provides an operating environment for other software executing in the computing system 700, and coordinates activities of the components of the computing system 700.

The tangible storage 740 may be removable or non-removable, and includes magnetic disks, magnetic tapes or cassettes, CD-ROMs, DVDs, or any other medium which can be used to store information in a non-transitory way and which can be accessed within the computing system 700. The storage 740 stores instructions for the software 780 implementing one or more innovations described herein.

The input device(s) 750 may be a touch input device such as a keyboard, mouse, pen, or trackball, a voice input device, a scanning device, or another device that provides input to the computing system 700. The output device(s) 760 may be a display, printer, speaker, CD-writer, or another device that provides output from the computing system 700.

The communication connection(s) 770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc., that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general purpose program, such as one or more lines of code in a larger or general purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 14—Cloud Computing Environment

Figure 8:
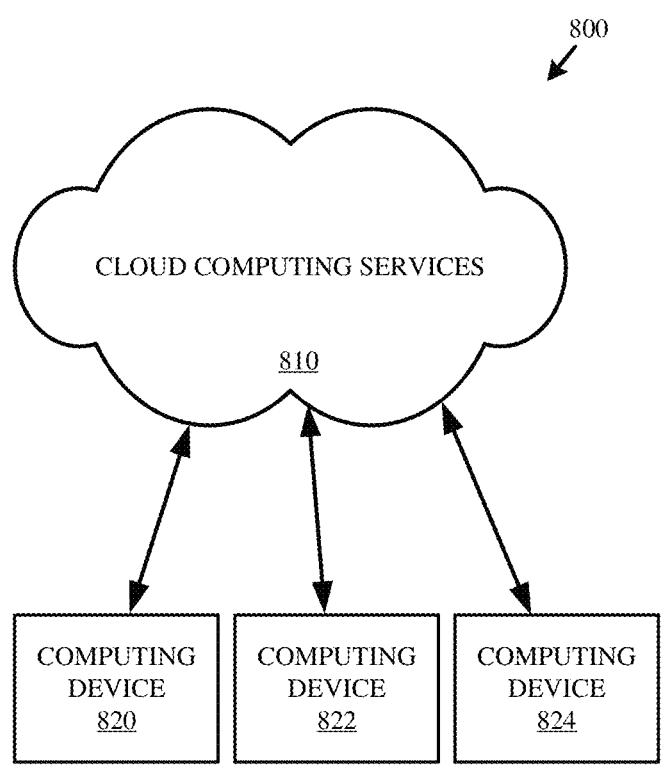
FIG. 8 is an example cloud computing environment that can be used in conjunction with the technologies described herein.

FIG. 8 depicts an example cloud computing environment 800 in which the described technologies can be implemented. The cloud computing environment 800 comprises cloud computing services 810. The cloud computing services 810 can comprise various types of cloud computing resources, such as computer servers, data storage repositories, networking resources, etc. The cloud computing services 810 can be centrally located (e.g., provided by a data center of a business or organization) or distributed (e.g., provided by various computing resources located at different locations, such as different data centers and/or located in different cities or countries).

The cloud computing services 810 are utilized by various types of computing devices (e.g., client computing devices), such as computing devices 820, 822, and 824. For example, the computing devices (e.g., 820, 822, and 824) can be computers (e.g., desktop or laptop computers), mobile devices (e.g., tablet computers or smart phones), or other types of computing devices. For example, the computing devices (e.g., 820, 822, and 824) can utilize the cloud computing services 810 to perform computing operations (e.g., data processing, data storage, and the like).

Example 15—Implementations

Although the operations of some of the disclosed methods are described in a particular, sequential order for convenient presentation, it should be understood that this manner of description encompasses rearrangement, unless a particular ordering is required by specific language set forth. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 7, computer-readable storage media include memory 720 and 725, and storage 740. The term computer-readable storage media does not include signals and carrier waves. In addition, the term computer-readable storage media does not include communication connections (e.g., 770).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. It should be understood that the disclosed technology is not limited to any specific computer language or program. For instance, the disclosed technology can be implemented by software written in C++, Java, Perl, JavaScript, Python, Ruby, ABAP, SQL, Adobe Flash, or any other suitable programming language, or, in some examples, markup languages such as html or XML, or combinations of suitable programming languages and markup languages. Likewise, the disclosed technology is not limited to any particular computer or type of hardware.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A system for view mining of database views to generate requested views in a database, the system comprising:
   one or more memories;
   one or more processing units coupled to the one or more memories; and
   one or more computer readable storage media storing instructions that, when loaded into the one or more memories, cause the one or more processing units to perform automatic view generation operations for:
      receiving a request to generate a requested view, wherein the request comprises a plurality of database object identifiers to be combined in the requested view;
      identifying one or more first views in the database, wherein the first views comprise the plurality of database object identifiers;
      if one or more first views are identified in the database:
         identifying one or more complete paths connecting the plurality of database object identifiers in the one or more first views;
         calculating one or more respective scores for the one or more complete paths;
         selecting an ultimate complete path based on the one or more respective scores for the one or more complete paths;
         generating the requested view based on the ultimate path selected to provide a generated requested view, wherein the generated requested view uses an accumulation of view development knowledge from existing, already developed views, improving view development time or improving quality of the generated requested view by selecting known, effective view combinations or interrelationships; and
      if no first views are identified in the database:
         identifying one or more second views in the database via the database identifier, wherein the second views comprise at least one of the plurality of database object identifiers;
         identifying a plurality of partial paths in the second views, wherein the respective partial paths in the plurality of partial paths comprise at least one of the plurality of database object identifiers;
         calculating respective scores for the respective identified partial paths in the plurality of identified partial paths;
         generating a composed path based on the plurality of identified partial paths and their respective scores, wherein the composed path connects the plurality of database object identifiers; and
         generating the requested view based on the generated composed path to provide a generated requested view, wherein the generated requested view uses an accumulation of view development knowledge from existing, already developed views, improving view development time or improving quality of the generated requested view by selecting known, effective view combinations or interrelationships; and
      providing the generated requested view.

2. One or more non-transitory computer-readable storage media storing computer-executable instructions for causing a computing system to perform a method for generating a proposed view in a database, the method comprising:
   receiving a proposed view request comprising a plurality of table identifiers for a respective plurality of tables in the database to be combined;
   identifying one or more current views in the database, wherein the current views comprise at least one of the plurality of table identifiers;
   identifying a plurality of partial paths in the current views, wherein the respective partial paths in the plurality of partial paths comprise at least one of the plurality of table identifiers;
   generating one or more composed paths for combining the plurality of tables based on the plurality of partial paths;
   providing the one or more composed paths in response to the proposed view request wherein the one or more composed paths use an accumulation of view development knowledge from existing, already developed views, improving path development time or improving quality of the one or more composed paths by selecting known, effective view combinations or interrelationships.

3. The one or more non-transitory computer-readable storage media of claim 2, the method further comprising:
   calculating one or more scores for the respective one or more identified partial paths.

4. The one or more non-transitory computer-readable storage media of claim 3, wherein the scores respectively comprise the frequency of use for the respective one or more identified partial paths.

5. The one or more non-transitory computer-readable storage media of claim 3, the method further comprising:
   generating one or more composed path scores for the respective one or more composed paths, wherein the respective composed path scores comprise the one or more scores for the respective one or more identified partial paths of which the respective composed paths are comprised.

6. The one or more non-transitory computer-readable storage media of claim 5, wherein providing the one or more composed paths further comprises providing the one or more composed path scores.

7. The one or more non-transitory computer-readable storage media of claim 5, the method further comprising:
   selecting a preferred composed path from the one or more composed paths based on the respective composed path scores;
   generating a proposed view based on the preferred composed path; and
   wherein the providing comprises providing the proposed view.

8. The one or more non-transitory computer-readable storage media of claim 2, wherein the one or more composed paths are provided via a user interface.

9. The one or more non-transitory computer-readable storage media of claim 2, the method further comprising:
   receiving a selected path from the provided one or more composed paths; and
   generating a proposed view based on the received selected path.

10. A method for providing one or more proposed views, the method comprising:
    receiving a request to generate a proposed view combining a plurality of tables in a database;

identifying one or more existing views in the database applicable to the request, wherein the existing views comprise the plurality of tables;

identifying one or more paths combining the plurality of tables in the respective one or more existing views; and providing the identified one or more paths, wherein the identified one or more paths use an accumulation of view development knowledge from existing, already developed views, improving path development time or improving quality of the identified one or more paths by selecting known, effective view combinations or interrelationships.

11. The method of claim 10, further comprising:
calculating one or more scores for the respective one or more paths combining the plurality of tables in the respective one or more existing views.

12. The method of claim 11, wherein the scores respectively comprise the frequency of use for the respective one or more partial paths.

13. The method of claim 11, wherein providing the identified one or more paths further comprises providing the respective calculated frequencies of use.

14. The method of claim 11, further comprising:
automatically selecting a preferred path from the one or more identified paths based on the respective one or more scores;
generating a view based on the preferred path; and
wherein providing the identified paths comprises providing the generated view.

15. The method of claim 10, wherein the identified one or more paths are provided via a user interface.

16. The method of claim 10, further comprising:
receiving a selected path from the provided one or more paths; and
generating a view based on the received selected path.

17. The method of claim 10, wherein the identified one or more paths are complete paths combining the plurality of tables.

18. The method of claim 10, wherein the identified one or more paths are partial paths comprising at least one table of the plurality of tables.

19. The method of claim 18, further comprising:
calculating a score for the respective one or more partial paths in the respective one or more existing views;
generating one or more composed paths based on the identified partial paths and their respective scores, wherein the composed path comprises a plurality of partial paths combining the plurality of tables in the proposed view request; and
wherein the providing comprises providing the one or more composed paths.

20. The method of claim 19, wherein the scores respectively comprise the frequency of use for the respective one or more partial paths.

* * * * *